United States Patent
Yamamoto

(10) Patent No.: US 10,479,441 B2
(45) Date of Patent: Nov. 19, 2019

(54) BICYCLE HUB ASSEMBLY AND BICYCLE CONTROL SYSTEM

(71) Applicant: Shimano Inc., Sakai, Osaka (JP)

(72) Inventor: Takashi Yamamoto, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 0 days.

(21) Appl. No.: 15/245,131

(22) Filed: Aug. 23, 2016

(65) Prior Publication Data

US 2018/0057107 A1 Mar. 1, 2018

(51) Int. Cl.
| | |
|---|---|
| *B62M 6/50* | (2010.01) |
| *B62M 11/16* | (2006.01) |
| *B60B 27/00* | (2006.01) |
| *B62M 6/60* | (2010.01) |
| *B62M 25/08* | (2006.01) |
| *B62L 5/00* | (2006.01) |
| *B60B 27/02* | (2006.01) |
| *B60B 27/04* | (2006.01) |
| *B62J 99/00* | (2009.01) |
| *B62L 5/10* | (2006.01) |

(52) U.S. Cl.
CPC ............ *B62M 6/50* (2013.01); *B60B 27/023* (2013.01); *B62L 5/00* (2013.01); *B62L 5/006* (2013.01); *B62L 5/10* (2013.01); *B62M 6/60* (2013.01); *B62M 11/16* (2013.01); *B62M 25/08* (2013.01); *B60B 27/0015* (2013.01); *B60B 27/04* (2013.01); *B60B 27/047* (2013.01); *B62J 2099/002* (2013.01); *B62J 2099/004* (2013.01); *B62J 2099/0013* (2013.01)

(58) Field of Classification Search
None
See application file for complete search history.

(56) References Cited

U.S. PATENT DOCUMENTS

| | | | |
|---|---|---|---|
| 2,800,986 A | * | 7/1957 | Van Der Plas ........... B62L 5/06 |
| | | | 192/108 |
| 4,240,533 A | | 12/1980 | Fukui |
| 4,323,146 A | | 4/1982 | Fukui |
| 8,210,974 B2 | | 7/2012 | Moeller |
| 2006/0131832 A1 | * | 6/2006 | Lindsay ................. A61G 5/023 |
| | | | 280/249 |
| 2006/0283644 A1 | * | 12/2006 | Matsueda ................ B62L 1/00 |
| | | | 180/206.6 |
| 2009/0305831 A1 | | 12/2009 | Moeller |
| 2011/0133542 A1 | * | 6/2011 | Ratti ....................... B60B 1/003 |
| | | | 301/6.5 |

(Continued)

FOREIGN PATENT DOCUMENTS

| | | | |
|---|---|---|---|
| CA | 2744210 | * | 3/2012 |
| JP | S55-046907 B2 | | 11/1980 |

(Continued)

OTHER PUBLICATIONS

Shimano spec sheet for Nexus 3 speed Hub from Internet HTTP:bike.shimano.com.*

*Primary Examiner* — Mark A Manley

(57) ABSTRACT

A bicycle hub assembly includes a hub shell including a braking surface. A coaster brake shoe is accommodated in the hub shell and cooperates with the braking surface to generate braking force. A motor is accommodated in the hub shell and configured to be controlled for at least changing or maintaining a gear ratio.

19 Claims, 10 Drawing Sheets

(56) References Cited

U.S. PATENT DOCUMENTS

2012/0305325 A1* 12/2012 Ito .......................... B62M 6/65
180/206.6

FOREIGN PATENT DOCUMENTS

| JP | H08-133167 A | 5/1996 |
| JP | H10-203466 A | 8/1998 |
| JP | 4785071 B2 | 10/2011 |
| JP | 5442814 B2 | 3/2014 |

* cited by examiner

BICYCLE HUB ASSEMBLY AND BICYCLE CONTROL SYSTEM

BACKGROUND

The present disclosure relates to a bicycle hub assembly and a bicycle control system.

The bicycle industry is constantly improving and developing various components of the bicycle. For example, Japanese Laid-Open Patent Publication No. 55-46907, which is incorporated herein by reference, discloses a bicycle internal transmission device provided with a coaster brake. The internal transmission device is movable in an axial direction. The internal transmission device includes a drive cam and a driven cam arranged in a hub shell. When activating and deactivating the coaster brake, the drive cam is moved in an axial direction to engage with and/or disengaged from the driven cam.

Japanese Laid-Open Patent Publication No. 10-203466 discloses a pedal assist bicycle provided with a front transmission device including a differential gear coupled to a crankshaft and an electric motor coupled to the differential gear and controlled by a controller to generate motor-powered assist force.

SUMMARY

It is an object of the present disclosure to provide new bicycle components and systems with novel structure and functionality.

Accordingly, one aspect of the present disclosure is to provide a bicycle hub assembly that includes the following: a hub shell including a braking surface; a coaster brake shoe accommodated in the hub shell to cooperate with the braking surface to generate braking force; and a motor accommodated in the hub shell and configured to be controlled for at least changing or maintaining a gear ratio.

In a second aspect of the bicycle hub assembly according to the first aspect, the motor is arranged remotely from the coaster brake shoe in an axial direction of the hub shell.

In a third aspect of the bicycle hub assembly according to the first or second aspect, the motor is arranged concentrically with a central axis of the hub shell.

In a fourth aspect of the bicycle hub assembly according to any one of the first to third aspects, the motor is directly or indirectly coupled to a controller, the motor is rotated at controlled motor speed in accordance with a gear ratio request signal from the controller to change the gear ratio in a stepped or stepless manner or maintain a selected gear ratio if the bicycle is being propelled with pedaling, and the motor is stopped in accordance with a rotation-stop signal from the controller if the bicycle is stopped.

A fifth aspect of the bicycle hub assembly according to any one of the first to fourth aspects further comprises a power supply conductor electrically connecting the motor with a battery or a generator.

A sixth aspect of the bicycle hub assembly according to any one of the first to fifth aspect further comprises a hub axle at least partially covered with the hub shell; a hub driver directly or indirectly coupled to a driving member and rotatable in a first direction and a second direction opposite to the first direction, wherein the hub driver is rotated in the first direction when a pedal is rotated in a forward travelling direction, and wherein the hub driver is rotated in the second direction when the pedal is rotated in a direction opposite to the forward travelling direction; and a transmission device arranged inside the hub shell to convey rotation of the hub driver in the first direction to the hub shell at a selected gear ratio; wherein the coaster brake shoe is configured to be pressed against the braking surface by a rotary motion of the transmission device caused by rotation of the hub driver in the second direction to generate frictional braking force, and wherein the transmission device includes the motor.

In a seventh aspect of the bicycle hub assembly according to the sixth aspect, the transmission device includes an epicyclic rotor mechanism directly or indirectly coupled to each of the hub driver, the coaster brake shoe, and the motor.

In an eighth aspect of the bicycle hub assembly according to the seventh aspect, the motor and the coaster brake shoe are arranged at opposite sides of the epicyclic rotor mechanism in an axial direction of the hub axle.

A ninth aspect of the bicycle hub assembly according to the seventh or eighth aspect, further comprises a first one-way clutch coupled to a first location on the epicyclic rotor mechanism. When the hub driver is rotated in the first direction, the first one-way clutch stops conveying the rotation of the hub driver in the first direction to the coaster brake shoe so that the coaster brake shoe does not generate frictional braking force. When the hub driver is rotated in the second direction, the first one-way clutch permits conveying the rotation of the hub driver in the second direction to the coaster brake shoe via the epicyclic rotor mechanism so that the coaster brake shoe generates frictional braking force.

In a tenth aspect of the bicycle hub assembly according to any one of the seventh and ninth aspects, the epicyclic rotor mechanism includes a sun rotor arranged coaxially with the hub axle, a plurality of planetary rotors coupled to the sun rotor, a carrier rotatably supporting the plurality of planetary rotors, and a ring rotor coupled to the plurality of planetary rotors. The motor includes a rotary shaft coupled to the sun rotor.

In an eleventh aspect of the bicycle hub assembly according to the tenth aspect, the rotary shaft of the motor is coupled to the sun rotor to rotate integrally with the sun rotor.

In a twelfth aspect of the bicycle hub assembly according to the eleventh aspect, the ring rotor is coupled to the hub driver to rotate integrally with the hub driver.

In a thirteenth aspect of the bicycle hub assembly according to the eleventh or twelfth aspect, when the hub driver is rotated in the second direction, the motor is controlled to generate and apply electromagnetic braking force to the sun rotor or to allow free rotation of the rotary shaft.

In a fourteenth aspect of the bicycle hub assembly according to the ninth aspect, the epicyclic rotor mechanism includes a sun rotor arranged coaxially with the hub axle, a plurality of planetary rotors coupled to the sun rotor, a carrier rotatably supporting the plurality of planetary rotors, and a ring rotor coupled to the plurality of planetary rotors. The motor includes a rotary shaft coupled to the sun rotor. The first one-way clutch is coupled to the ring rotor and the carrier to convey rotation of the hub driver in the second direction to the coaster brake shoe via the first one-way clutch and the carrier and not to convey rotation of the hub driver in the first direction to the carrier.

A fifteenth aspect of the bicycle hub assembly according to the fourteenth aspect further comprises a second one-way clutch coupled to a second location on the epicyclic rotor mechanism. The second location is different from the first location in an axial direction of the hub axle. The second one-way clutch is configured to convey rotation of the hub driver in the first direction to the hub shell via the second one-way clutch and the carrier and not to convey rotation of the hub driver in the second direction to the hub shell.

In a sixteenth aspect of the bicycle hub assembly according to the fifteenth aspect, the carrier includes a plurality of planetary shafts that rotatably support the plurality of planetary rotors, respectively. The plurality of planetary rotors are arranged between the first location and the second location of the epicyclic rotor mechanism.

A seventeenth aspect of the bicycle hub assembly according to the fifteenth aspect further comprises a third one-way clutch, arranged at a third location on the epicyclic rotor mechanism different from the first and second locations in the axial direction of the hub axle, to convey rotation of the ring rotor to the carrier and not to convey rotation of the carrier to the ring rotor. The third one-way clutch is coupled to the ring rotor and the carrier to integrally rotate the ring rotor and the carrier at a rotation rate which is equal to a rotation rate of the hub driver when the motor is not rotated.

In an eighteenth aspect of the bicycle hub assembly according to any one of the tenth to thirteenth aspects, the carrier includes a cam surface arranged oppositely to the motor in an axial direction and rotatably supporting a brake roller. The cam surface is shaped such that the brake roller presses the coaster brake shoe toward the braking surface in a radially outward direction when the hub driver is rotated in the second direction.

A nineteenth aspect of the bicycle hub assembly according to the seventh aspect further comprises a first one-way clutch coupled to the hub shell and a ring rotor of the epicyclic rotor mechanism, and a second one-way clutch coupled to the ring rotor and a carrier of the epicyclic rotor mechanism. The first and second one-way clutches are arranged so that the rotation of the hub driver in the first direction is conveyed to the hub shell via the carrier, the second one-way clutch, the ring rotor and the first one-way clutch in a sequential manner, and the rotation of the hub driver in the second direction is conveyed to the coaster brake shoe via the carrier without involving the ring rotor and the first and second one-way clutches.

In a twentieth aspect of the bicycle hub assembly according to the nineteenth aspect, the first one-way clutch is coupled to a first radial position of the ring rotor, and the second one-way clutch is coupled to a second radial position of the ring rotor, the second radial position is different from the first radial position.

A twenty-first aspect of the present invention is a bicycle control system that includes the following: a first motor; a hub assembly including a hub driver coupled to a crank shaft via at least a driving member; and a second motor arranged in the hub assembly to generate torque for at least changing or maintaining a gear ratio.

A twenty-second aspect of the bicycle control system according to the twenty-first aspect, further comprises at least one rotation sensor arranged to detect rotation of one or both of the crankshaft and the hub driver and to output a sensor signal.

A twenty-third aspect of the bicycle control system according to the twenty-second aspect further comprises a controller connected to the first motor, the second motor, and the at least one rotation sensor to control the first motor and the second motor in accordance with the sensor signal provided from the at least one rotation sensor.

A twenty-fourth aspect of the bicycle control system according to the twenty-third aspect further comprises a battery and/or a generator electrically connected to the first motor, the second motor, and the controller.

In a twenty-fifth aspect of the bicycle control system according to any one of the twenty-second to twenty-fourth aspects, the at least one rotation sensor includes a cadence sensor that detects rotation rate of the crankshaft.

In a twenty-sixth aspect of the bicycle control system according to the twenty-fifth aspect, the controller generates a first control signal for controlling the first motor in accordance with the sensor signal provided from the cadence sensor.

In a twenty-seventh aspect of the bicycle control system according to the twenty-fifth or twenty-sixth aspect, the controller generates a second control signal for controlling the second motor in accordance with the sensor signal provided from the cadence sensor.

In a twenty-eighth aspect of the bicycle control system according to any one of the twenty-second to twenty-fifth aspects, the at least one rotation sensor includes a hub rotation sensor that detects rotation rate of the hub driver.

In a twenty-ninth aspect of the bicycle control system according to the twenty-eighth aspect, the controller generates a first control signal for controlling the first motor in accordance with the sensor signal provided from the hub rotation sensor.

In a thirtieth aspect of the bicycle control system according to any one of the twenty-fifth to twenty-seventh aspect, the controller generates a second control signal for controlling the second motor in accordance with the sensor signal provided from the hub rotation sensor.

In a thirty-first aspect of the bicycle control system according to any one of the twenty-second to thirtieth aspects, the controller includes an interface connected via a wired or wireless communication link to the at least one rotation sensor, a memory storing computer readable instructions for controlling the first motor and the second motor in accordance with the sensor signal received by the interface, and a processor configured to access the memory to execute the computer readable instructions and to generate a motor control signal for controlling the first motor and the second motor.

In a thirty-second aspect of the bicycle control system according to the thirty-first aspect, the first motor include a first assist motor that generates torque for producing motor-powered assist force. The controller is configured to provide the first assist motor with a motor-powered assist request signal as the motor control signal. The first assist motor rotates to add a motor-powered assist force corresponding to the motor-powered assist request signal to the driving member.

In a thirty-third aspect of the bicycle control system according to the thirty-second aspect, the controller is configured to provide the second motor with a gear ratio request signal as the motor control signal. The second motor rotates at controlled motor speed corresponding to the gear ratio request signal to change the gear ratio in a stepped or stepless manner or to maintain a selected gear ratio.

In a thirty-fourth aspect of the bicycle control system according to any one of the twenty-first and thirty-third aspects, the hub assembly includes a hub shell including a braking surface, and a coaster brake shoe accommodated in the hub shell to cooperate with the braking surface to generate braking force.

Other aspects and advantages of the present invention will become apparent from the following description, taken in conjunction with the accompanying drawings, illustrating by way of example the principles of the invention.

DESCRIPTION OF EMBODIMENTS

A bicycle hub assembly in accordance with one embodiment will now be described with reference to FIGS. 1 to 4.

Various embodiments will now be described with reference to the drawings. It will be apparent to those skilled in the art from this disclosure that the following descriptions of the embodiments are provided for illustration only and not for the purpose of limiting the invention as defined by the appended claims and their equivalents.

In the present application, the following directional terms "front", "rear", "forward", "rearward", "left", "right", "upward" and "downward" as well as any other similar directional terms refer to those directions which are determined on the basis of the rider who is riding the bicycle with facing the handlebar, for example. Accordingly, these terms, as used to describe the bicycle hub assembly, should be interpreted relative to the bicycle as used in an upright riding position on a horizontal surface.

Figure 1:
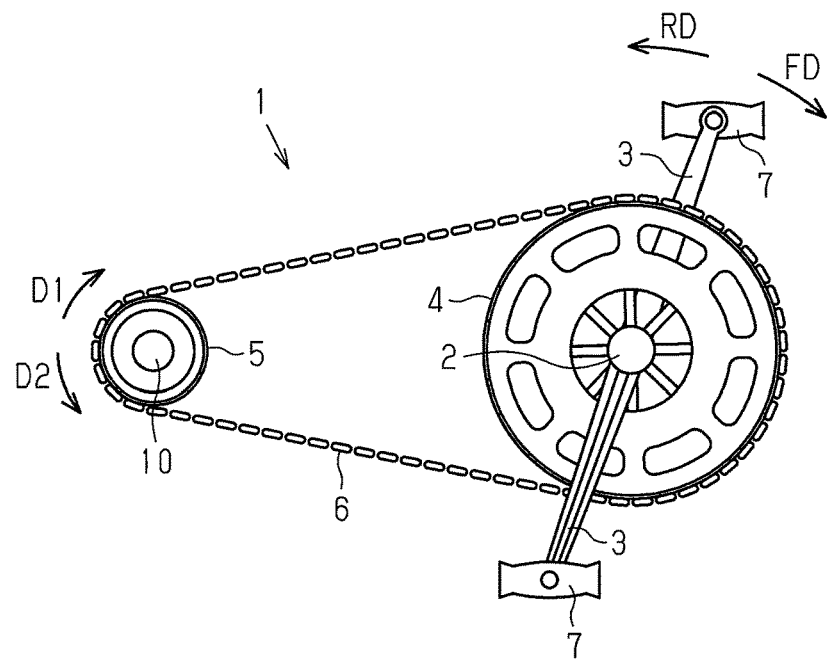
FIG. 1 is a schematic diagram of a bicycle drivetrain.

As shown in FIG. 1, a bicycle drive train 1 includes a crankshaft 2, a pair of crank arms 3, a front sprocket 4, a rear sprocket 5 and a driving member 6. The crank arms 3 are coupled to respective ends of the crankshaft 2 in an axial direction. Pedals 7 each include a pedal body and a pedal shaft. The pedal body is rotatably supported by the pedal shaft. The pedal shaft is coupled to the crank arm 3. The front sprocket 4 is integrally rotatable with the crankshaft 2. The rear sprocket 5 is connected to the front sprocket 4 via the driving member 6, such as a chain. The rear sprocket 5 is fixedly attached to a bicycle hub assembly 10. The rear sprocket 5 can be selectively attached to and detached from the bicycle hub assembly 10 without damaging the rear sprocket 5 and the bicycle hub assembly 10. It will be apparent to those skilled in the bicycle field from the present disclosure that the sprockets 4 and 5 can be changed to pulleys or gears and that the driving member 6 can be changed to a flexible belt or a drive shaft.

Figure 2:
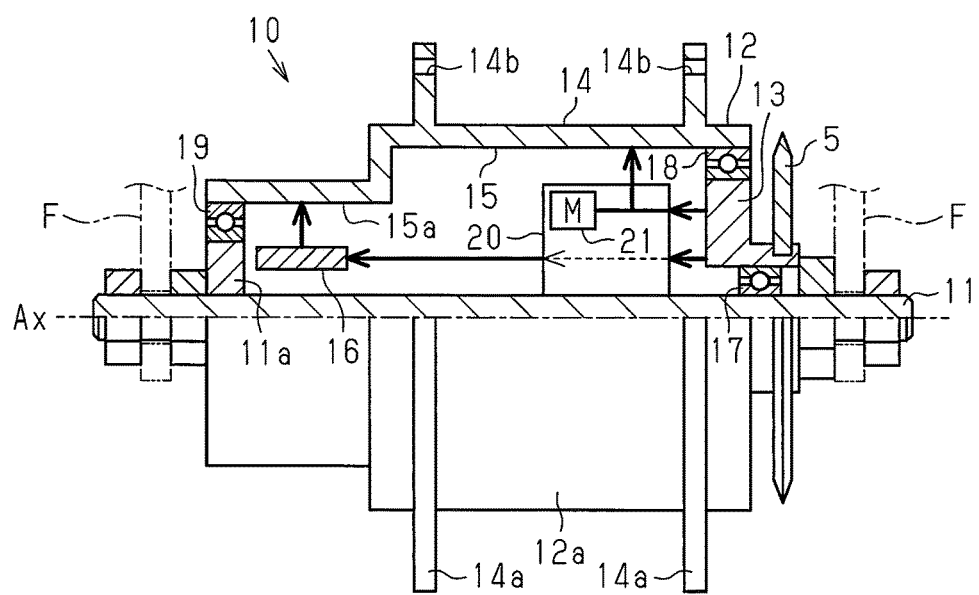
FIG. 2 is a schematic cross-sectional view of a bicycle hub assembly in accordance with a first embodiment.

FIG. 2 illustrates the bicycle hub assembly 10 in accordance with the first embodiment. The bicycle hub assembly 10 includes a hub axle 11, a hub shell 12, and a hub driver 13. The hub axle 11 is configured to be fixedly attached to a bicycle frame F, such as a chain stay. The hub axle 11 includes a threaded outer surface at either end of the hub axle 11 in an axial direction. The hub axle 11 is a solid shaft or a hollow shaft having an axial through hole. In the description hereafter, the axial direction refers to the horizontal direction of FIG. 2, which is parallel to a central axis Ax of the hub axle 11. The central axis Ax may also be referred to as a central axis of the hub shell 12. In the present embodiment, the hub axle 11 is at least partially covered with the hub shell 12.

The rear sprocket 5 is fixedly attached to or formed integrally with the hub driver 13 of the bicycle hub assembly 10. The hub driver 13 is directly or indirectly coupled to the driving member 6 (FIG. 1) and is rotatable in a first direction D1 and a second direction D2 opposite to the first direction D1. In the present embodiment, the hub driver 13 is coupled to the driving member 6 via the rear sprocket 5. As shown in FIG. 1, when the pedal 7, or the crankshaft 2, is rotated in a forward travelling direction FD, the hub driver 13 is rotated in a first direction D1. When the pedal 7, or the crankshaft 2, is rotated in a direction RD opposite to the forward travelling direction FD, the hub driver 13 is rotated in a second direction D2 opposite to the first direction D1. The hub shell 12 includes a hollow cylinder portion 12a and a pair of hub flanges 14a. The hollow cylinder portion 12a includes an outer surface 14 and an inner surface 15. The hub flanges 14a are disposed on the outer surface 14. Each hub flange 14a includes a plurality of spoke holes 14b. The hub flanges 14a are spaced from one another in the axial direction. The hollow cylinder portion 12a and the hub flanges 14a are integrally formed as a one-piece member. The inner surface 15 includes a braking surface 15a. A coaster brake shoe 16 is accommodated in the hub shell 12 at a position facing the braking surface 15a. The coaster brake shoe 16 is configured to cooperate with the braking surface 15a to generate frictional braking force.

A first bearing 17 is coupled to the inner surface of the hub driver 13 and an outer surface of the hub axle 11 so that the hub driver 13 is rotatable with respect to the hub axle 11. A second bearing 18 is coupled to the inner surface 15 of the hub shell 12 and an outer surface of the hub driver 13 so that the hub shell 12 is rotatable with respect to the hub driver 13 about the hub axle 11. A third bearing 19 is coupled to the inner surface 15 of the hub shell 12 and a positioning member 11a fixed on the outer surface of the hub axle 11 so that the hub shell 12 is rotatable about the hub axle 11.

The hub shell 12 accommodates a transmission device 20, which functions as a coaster brake-actuating and gear-shifting device. The transmission device 20 is coupled to the hub driver 13, the hub shell 12, and the coaster brake shoe 16. The transmission device 20 is configured to transmit rotation motion of the hub driver 13 to one of the hub shell 12 and the coaster brake shoe 16 depending on the rotation direction of the hub driver 13. The transmission device 20 has variable gear ratios, or transmission ratios, and includes an electric motor 21 configured to be controlled for changing gear ratios of the bicycle hub assembly 10 and/or maintaining a selected gear ratio.

Figure 3:
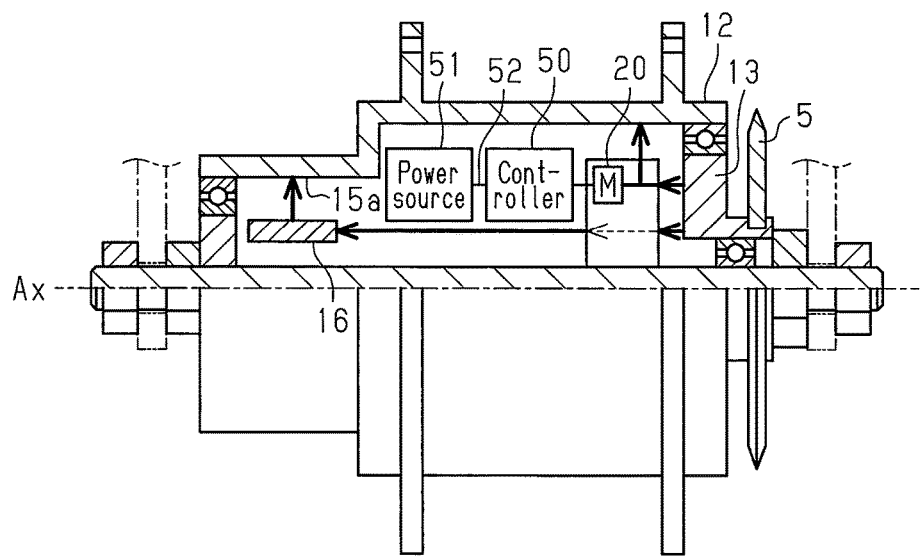
FIGS. 3 and 4 are block diagrams of the bicycle hub assembly of FIG. 2.

As shown in FIG. 3, a controller 50 for controlling the motor 21 is arranged inside the hub shell 12. In an embodiment, the controller 50 is connected to the motor 21 via a lead wire. In other embodiment, the controller 50 is mounted on an outer surface of the motor 21 and directly connected to the motor 21 via an electric contact set. The controller 50 provides the motor 21 with motor control signals via the lead wire or the electric contact set. As will be discussed later, the motor control signals include a gear ratio request signal MC1, a rotation-stop signal MC2, and a stand-by signal MC3.

As shown in FIG. 3, the motor 21 is powered by an electric power source 51 arranged inside the hub shell 12. The electric power source 51 supplies electric power directly or indirectly to the motor 21 and the controller 50 via a power supply conductor 52. The power supply conductor 52 electrically connects the motor 21 with the electric power source 51, which can be a battery and/or a generator, such as a hub dynamo.

Figure 4:
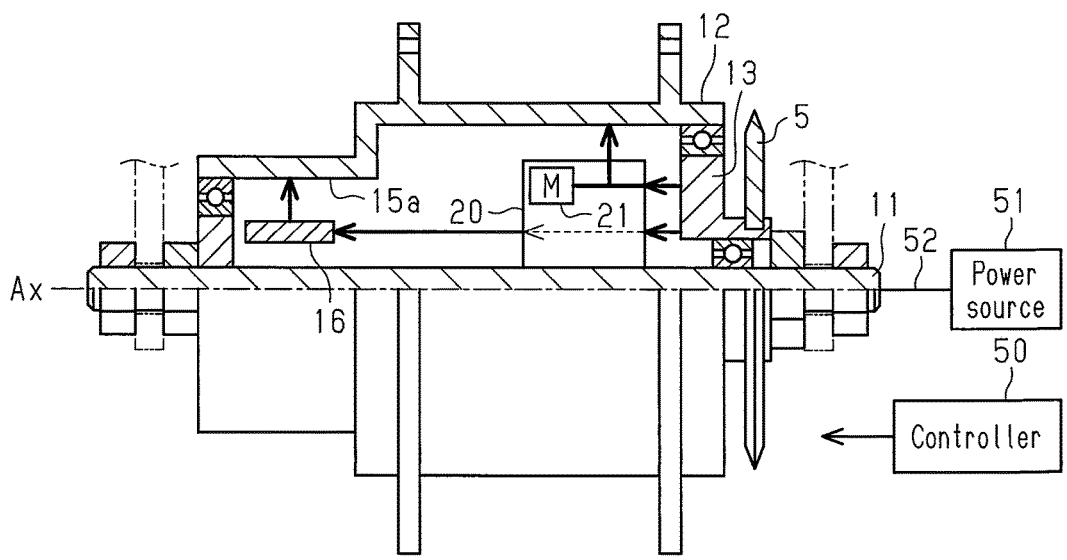

In an example of FIG. 4, the controller 50 and the electric power source 51 are arranged outside the hub shell 12. In this case, the power supply conductor 52 includes a lead wire led out from the hub shell 12 through the axial through hole of the hub axle 11 to the electric power source 51. The electric power source 51 can be a rechargeable battery (252 in FIG. 19) detachably mounted on a bicycle frame, e.g., a down tube, a seat tube, or a rear carrier of the bicycle B. The controller 50 can be integrated with one or more of a cycle computer 300 (FIG. 19), an operating unit 301, such as a lever mounted on a handlebar 302, and a housing of the power source 51. It will be apparent to those skilled in the bicycle field from the present disclosure that the electrical connection between the motor 21, the electric power source 51, and the controller 50 are not limited to those of FIGS. 3 and 4 and can be changed to different structures if needed and/or desired.

The bicycle hub assembly 10 can selectively operate in one of the following functional states: propelling; braking; and coasting. Propelling occurs when the rider pedals forward (the forward travelling direction FD of FIG. 1) to rotate the hub driver 13 in the first direction D1 to accelerate the bicycle. Braking occurs when the rider pedals backward (the direction RD of FIG. 1) and then pushes the pedals 7 harder or softer to achieve more or less braking, respectively. Coasting occurs when the rider keeps the pedals 7 stationary or when no driving force is conveyed from the front sprocket 4 to the hub shell 12 via the driving member 6, the rear sprocket 5, and the hub driver 13.

Figure 5:
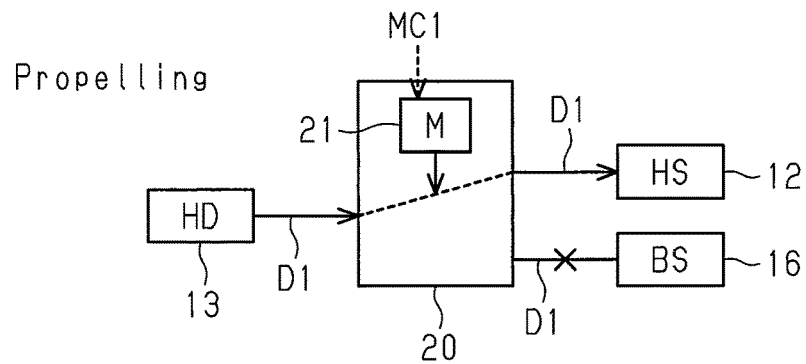
FIG. 5 is a block diagram of the bicycle hub assembly of FIG. 2 when the bicycle is propelling.
Figure 6:
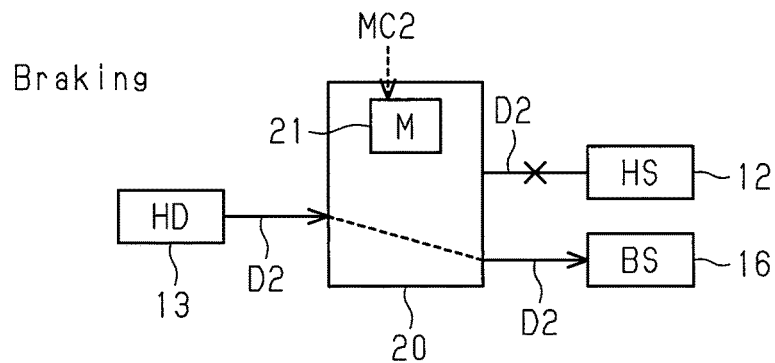
FIG. 6 is a block diagram of the bicycle hub assembly of FIG. 2 when the bicycle is braking.
Figure 7:
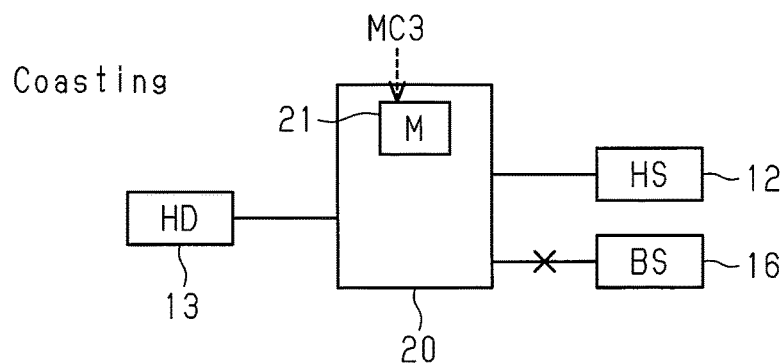
FIG. 7 is a block diagram of the bicycle hub assembly of FIG. 2 when the bicycle is coasting.

Referring to FIGS. 5 to 7, operations of the bicycle hub assembly 10 of FIG. 2 is described below. In FIGS. 5 to 7, "HS" is an abbreviation for the hub shell 12, "HD" is an abbreviation for the hub driver 13, "BS" is an abbreviation for the coaster brake shoe 16, and "M" is an abbreviation for the motor 21.

As shown in FIG. 5, the hub driver 13 rotates in the first direction D1 when the rider pedals forward to propel the bicycle. The transmission device 20 conveys the rotation motion of the hub driver 13 in the first direction D1 to the hub shell 12. The transmission device 20 does not convey the rotation motion of the hub driver 13 in the first direction D1 to the coaster brake shoe 16. The controller 50 controls the motor 21 to generate torque with providing a gear ratio request signal MC1. The motor 21 generates torque in accordance with the gear ratio request signal MC1 to change the gear ratio of the bicycle hub assembly 10 or to maintain a selected gear ratio.

As shown in FIG. 6, the hub driver 13 rotates in the second direction D2 when the rider pedals backward to stop the bicycle. The transmission device 20 does not convey the rotation motion of the hub driver 13 in the second direction D2 to the hub shell 12. Rather, the transmission device 20 conveys the rotation motion of the hub driver 13 in the second direction D2 to the coaster brake shoe 16. This displaces the coaster brake shoe 16 in the radial direction toward the braking surface 15a of the hub shell 12, thereby generating frictional braking force.

The controller 50 controls the motor 21 not to generate torque when the hub driver 13 is rotated in the second direction D2. For example, the motor 21 simply stops generating torque in accordance with the rotation-stop signal MC2 from the controller 50. It is preferable that the motor 21 generates electromagnetic braking force in accordance with the rotation-stop signal MC2 to forcibly stop and immobilize the motor 21.

As shown in FIG. 7, when the bicycle is coasting, the transmission device 20 disengages both the hub shell 12 and the coaster brake shoe 16 from the hub driver 13. Accordingly, the hub shell 12 continues acceleration and/or deceleration during coasting by inertia.

It is preferable that the controller 50 provides the motor 21 with the stand-by signal MC3 so that the motor 21 rotates at a relatively low motor speed when the bicycle is coasting. This shortens response time of the motor 21 when entering the propelling state. However, it will be apparent to those skilled in the bicycle field from the present disclosure that the motor 21 is controlled not to generate torque or forcibly stop rotating as described above.

As explained above, the bicycle hub assembly 10 of the first embodiment includes the hub shell 12 including the braking surface 15a, the coaster brake shoe 16 accommodated in the hub shell 12 to cooperate with the braking surface 15a to generate braking force, and the motor 21 accommodated in the hub shell 12 and configured to be controlled for at least changing or maintaining a gear ratio. Therefore the bicycle hub assembly 10 has both a coaster braking function and an electrically gear shifting function in a single unit, e.g., the hub shell 12.

Some working examples of the bicycle hub assembly 10 of the first embodiment are described below. Elements having substantially the same function as those explained above will be numbered with the same reference numbers here, and will not be described again in detail.

Figure 8:
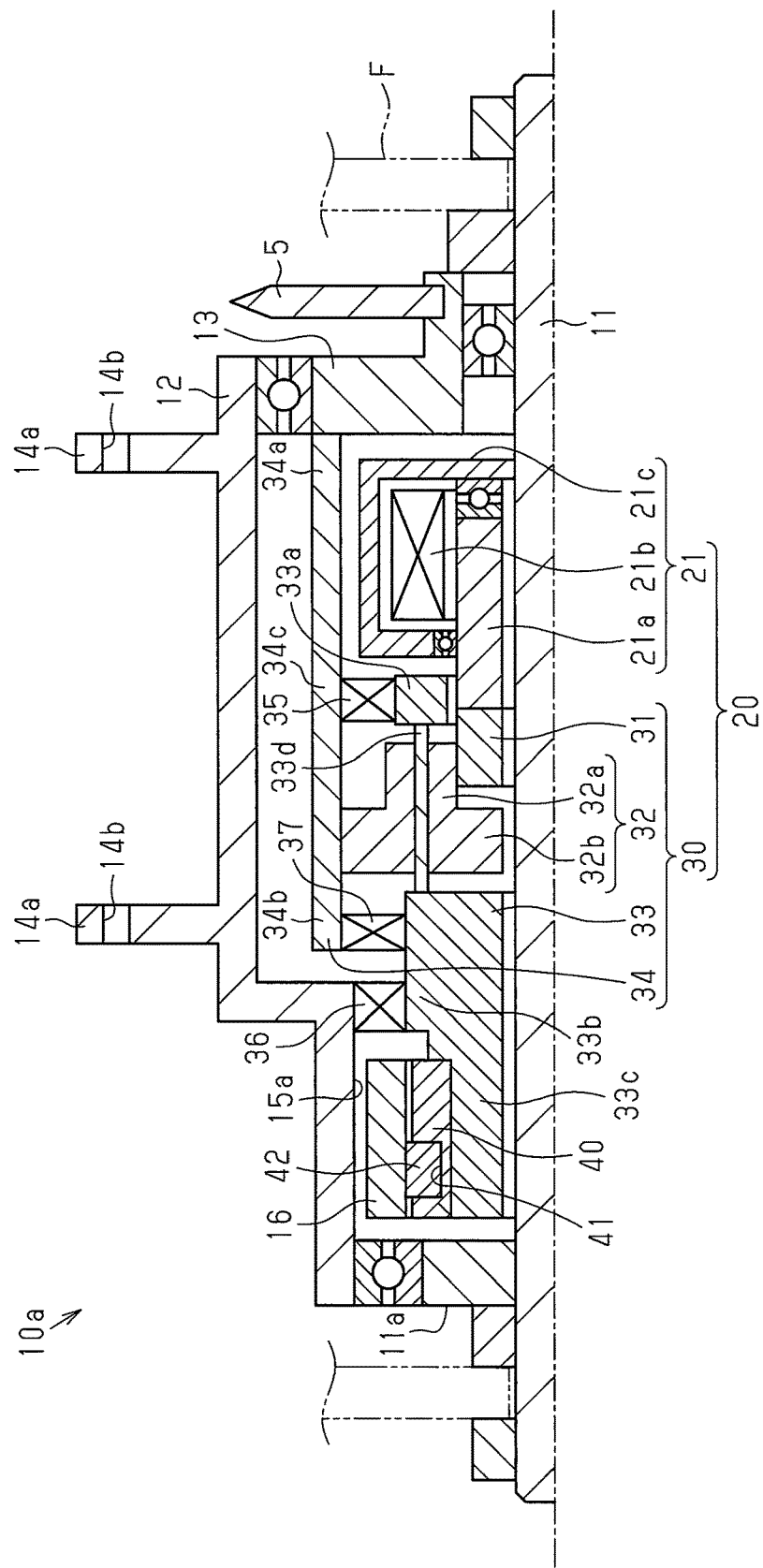
FIG. 8 is a cross-sectional view of a bicycle hub assembly in accordance with a first working example of the first embodiment.

FIG. 8 illustrates a bicycle hub assembly 10a in accordance with a first working example of the first embodiment.

The motor 21 includes a rotary shaft 21a including a magnetic core, an electromagnetic coil 21b, and a motor housing 21c. The rotary shaft 21a is tubular. The motor housing 21c is fixed on the hub axle 11.

The transmission device 20 includes an epicyclic rotor mechanism 30 directly or indirectly coupled to each of the rotary shaft 21a, the hub driver 13, and the coaster brake shoe 16. The epicyclic rotor mechanism 30 is an epicyclic gear mechanism in which all rotors are gear wheels. However, it will be apparent to those skilled in the bicycle field from the present disclosure that the epicyclic rotor mechanism 30 can be changed to an epicyclic friction mechanism in which all rotors are toothless rotors each having friction contact with a respective toothless rotor.

The epicyclic rotor mechanism 30 includes a sun rotor 31, a plurality of planetary rotors 32, a carrier 33, and a ring rotor 34. The sun rotor 31 is arranged coaxially with the hub axle 11. The plurality of planetary rotors 32 are coupled to the sun rotor 31. The carrier 33 rotatably supports the plurality of planetary rotors 32. The ring rotor 34 is coupled to the plurality of planetary rotors 32.

The sun rotor 31, the carrier 33, and the ring rotor 34 each have a rotation axis coaxial with the hub axle 11. Each planetary rotor 32 has a rotation axis parallel to but not coaxial with the hub axle 11.

As will be apparent from the following description, the ring rotor 34 and the carrier 33 of the bicycle hub assembly 10a of FIG. 8 serve as a rotation input member and a rotation output member, respectively.

The sun rotor 31 is coupled to the rotary shaft 21a of the motor 21. The sun rotor 31 is annular. The sun rotor 31 is fixedly attached to or integrally formed with the rotary shaft 21a. The sun rotor 31 is rotated by the motor 21. Accordingly, the rotary shaft 21a of the motor 21 is coupled to the sun rotor 31 to rotate integrally with the sun rotor 31.

Each of the planetary rotors 32 is a stepped rotor including a smaller diameter portion 32a and a larger diameter portion 32b with a radial step therebetween. The smaller diameter portion 32a is meshed with the sun rotor 31. The larger diameter portion 32b is meshed with the ring rotor 34.

The carrier 33 includes an annular portion 33a, a circular cylindrical intermediate portion 33b, and a coaster brake mount portion 33c. The annular portion 33a, the circular cylindrical intermediate portion 33b, and the coaster brake mount portion 33c are integrally formed as a one-piece member. In other embodiment, the annular portion 33a, the circular cylindrical intermediate portion 33b, and the coaster brake mount portion 33c can be discrete members that are assembled to form the carrier 33 as a one-piece member. The carrier 33 includes one or more openings for accommodating the planetary rotors 32 between the annular portion 33a and the circular cylindrical intermediate portion 33b in the axial direction. The annular portion 33a and the circular cylindrical intermediate portion 33b may be referred to as first and second locations of the epicyclic rotor mechanism 30.

The carrier 33 includes a plurality of planetary shafts 33d that rotatably support the plurality of planetary rotors 32, respectively. The planetary rotors 32 supported by the planetary shafts 33d are disposed in the one or more openings of the carrier 33 between the annular portion 33a and the circular cylindrical intermediate portion 33b. The planetary rotors 32 are arranged between the annular portion 33a and the circular cylindrical intermediate portion 33b. The annular portion 33a is distanced from the hub driver 13 in the axial direction to form an annular space for accommodating the motor 21. The annular portion 33a of the carrier 33 includes a center hole and an inner surface spaced from the sun rotor 31 and/or the rotary shaft 21a of the motor 21 in the radial direction. The annular portion 33a may be an annular tube or a polyangular tube having a center hole.

The circular cylindrical intermediate portion 33b is arranged between the annular portion 33a and the coaster brake mount portion 33c in the axial direction. In the first working example, the circular cylindrical intermediate portion 33b has a larger diameter than the coaster brake mount portion 33c.

The annular portion 33a, the circular cylindrical intermediate portion 33b, and the coaster brake mount portion 33c are integrally rotatable about the hub axle 11. Therefore the carrier 33 rotates around the hub axle 11 while the planetary rotors 32 rotate about the respective planetary shafts 33d.

In the first working example, the carrier 33 includes the planetary shafts 33d. However, the planetary shafts 33d may be parts of the planetary rotors 32. In this case, the annular portion 33a and the circular cylindrical intermediate portion 33b of the carrier 33 rotatably receive axial ends of each planetary shaft 33d.

The ring rotor 34 is coupled to the hub driver 13 to rotate integrally with the hub driver 13. In the present embodiment, the ring rotor 34 is a hollow cylinder including an axially first end 34a, an axially second end 34b, and an axially intermediate portion 34c extending between the axially first end 34a and the axially second end 34b. The hub driver 13 is fixedly connected to or integrally formed with the axially first end 34a of the ring rotor 34. The ring rotor 34 is rotated integrally with the hub driver 13 in the first direction D1 and the second direction D2.

The bicycle hub assembly 10a includes a first one-way clutch 35 coupled to a first location on the epicyclic rotor mechanism 30. When the hub driver 13 is rotated in the first direction D1, the first one-way clutch 35 stops conveying the rotation of the hub driver 13 in the first direction D1 to the coaster brake shoe 16 so that the coaster brake shoe 16 does not generate frictional braking force. When the hub driver 13 is rotated in the second direction D2, the first one-way clutch 35 permits conveying the rotation of the hub driver 13 in the second direction D2 to the coaster brake shoe 16 via the epicyclic rotor mechanism 30 so that the coaster brake shoe 16 generates frictional braking force. In the present embodiment, the first one-way clutch 35 is coupled to the carrier 33, for example at the annular portion 33a of the carrier 33, and the ring rotor 34, for example at the intermediate portion 34c of the ring rotor 34 to convey rotation of the hub driver 13 in the second direction D2 to the coaster brake shoe 16 via the first one-way clutch 35 and the carrier 33 and not to convey rotation of the hub driver 13 in the first direction D1 to the carrier 33. For example, the first one-way clutch 35 is configured to disengage the ring rotor 34 from the annular portion 33a of the carrier 33 when the hub driver 13 (the ring rotor 34) is rotating in the first direction D1 and to engage the ring rotor 34 with the annular portion 33a of the carrier 33 when the hub driver 13 (the ring rotor 34) is rotating in the second direction D2.

The bicycle hub assembly 10 includes a second one-way clutch 36 coupled to the circular cylindrical intermediate portion 33b of the carrier 33, which is different from the annular portion 33a. The second one-way clutch 36 is configured to convey rotation motion of the hub driver 13 in the first direction D1 to the hub shell 12 via the second one-way clutch 36 and the carrier 33 and not to convey rotation motion of the hub driver 13 in the second direction D2 to the hub shell 12. For example, the second one-way clutch 36 engages the circular cylindrical intermediate portion 33b of the carrier 33 with the hub shell 12 when the hub driver 13 (the ring rotor 34) and the carrier 33 are rotating in the first direction D1 at the same rate. The second one-way clutch 36 disengages the circular cylindrical intermediate portion 33b of the carrier 33 from the hub shell 12 when the hub driver 13 (the ring rotor 34) and the carrier 33 are rotating in the second direction D2 or when the hub shell 12 rotates in the first direction D1 faster than the carrier 33. The second one-way clutch 36 has a general roller clutch mechanism or a general pawl clutch mechanism.

A third one-way clutch 37 is coupled to the epicyclic rotor mechanism 30, for example, at a third location of the carrier 33 separated or different from the first and second one-way clutches 35 and 36 in the axial direction of the hub axle 11. The third one-way clutch 37 is configured to convey rotation motion of the ring rotor 34 to the carrier 33. The third one-way clutch 37 is configured not to convey rotation motion of the carrier 33 to the ring rotor 34 when the carrier 33 rotates in the second direction D2 or when the carrier 33 rotates faster than the ring rotor 34 in the first direction D1. The third one-way clutch 37 is coupled to the ring rotor 34 and the carrier 33 to integrally rotate the ring rotor 34 and the carrier 33 at a rotation rate which is equal to a rotation rate of the hub driver 13 when the motor 21 is not rotated. In short, main function of the third one-way clutch 37 is to rotate the carrier 33 with a 1:1 gear ratio relative to the hub driver 13. Provision of the third one-way clutch 37 is preferable because it eliminates the need to activate and/or drive the motor 21 for the purpose of equalizing angular velocity of the carrier 33 with that of the hub driver 13 in the first direction D1. This simplifies and downsizes the computer program for controlling the motor 21, lowers computation load of the controller 50, and reduces power consumption of the electric power source 51 by the motor 21 and/or the controller 50. The third one-way clutch 37 has a general roller clutch mechanism or a general pawl clutch mechanism.

Figure 9:
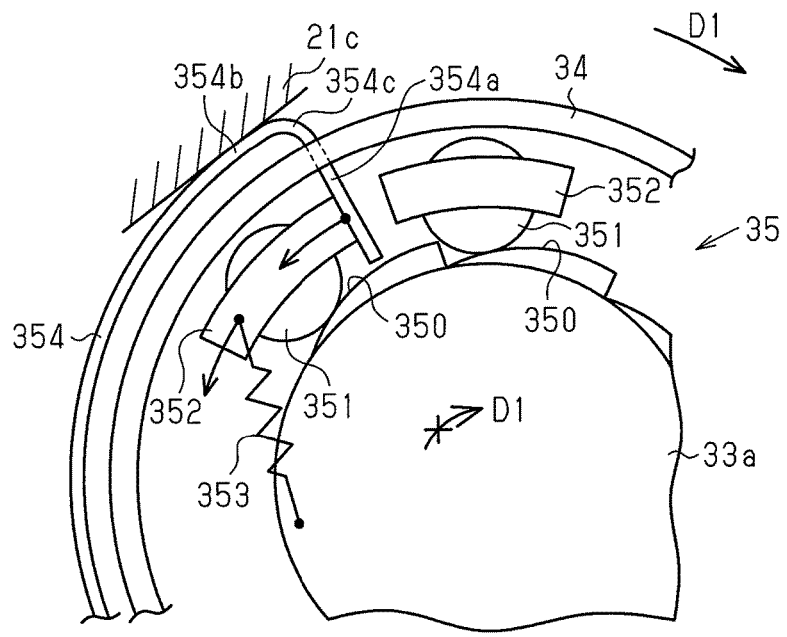
FIGS. 9 and 10 are cross-sectional views of a first one-way clutch of the bicycle hub assembly of FIG. 8.
Figure 10:
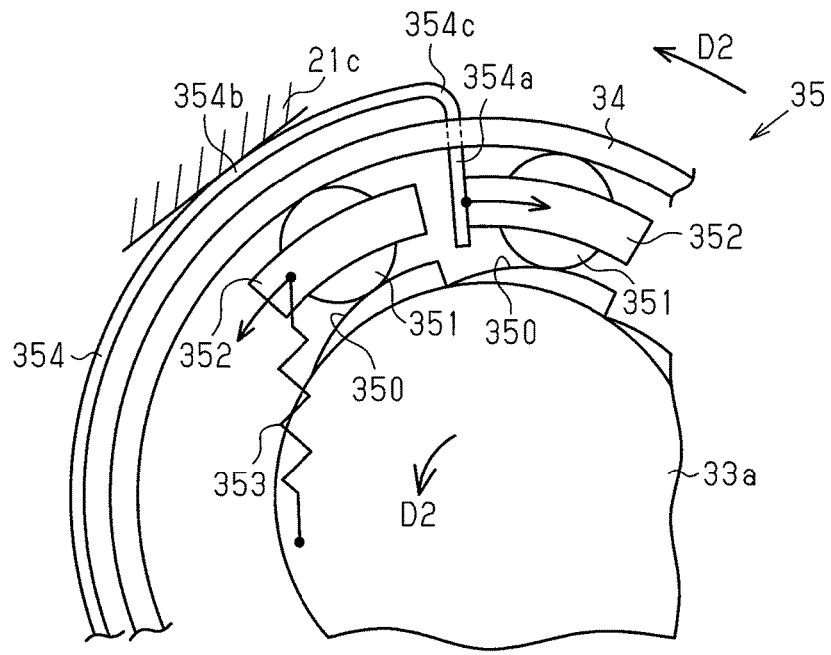

FIGS. 9 and 10 illustrate an example of the first one-way clutch 35. The first one-way clutch 35 includes cam surfaces 350, rollers 351, a ring-shaped, movable roller case 352, a first biasing member 353, and a second biasing member 354.

The cam surfaces 350 include recesses formed on the outer surface of the annular portion 33a of the carrier 33 with a certain angular interval. Alternatively, the cam surfaces 350 may be formed in an inner race fixedly attached to the outer surface of the annular portion 33a or in an outer race fixedly attached to the inner surface of the ring rotor 34.

The rollers 351 are arranged on the cam surfaces 350, respectively. The roller case 352 is movable in the first direction D1 and the second direction D2 and rotatably supports the rollers 351 within the corresponding cam surfaces 350.

The first biasing member 353 resiliently connects the roller case 352 and the annular portion 33a of the carrier 33. The first biasing member 353 may be a coil spring.

The second biasing member 354 is arranged between the roller case 352 and an immovable component, such as the motor housing 21c of the motor 21. The second biasing member 354 includes a proximal end 354a and a slide-contact portion 354b including a bend portion 354c. The proximal end 354a is loosely received by the roller case 352. The slide-contact portion 354b is resiliently contacted with the immovable component. The second biasing member 354 is so-called a slide spring.

As shown in FIG. 9, when the ring rotor 34 is rotating in the first direction D1, the proximal end 354a of the second biasing member 354 engages with the roller case 352 to bias the roller case 352 and the rollers 351 in the second direction D2. Simultaneously, the first biasing member 353 biases the roller case 352 in the second rotation direction D2. Accordingly, the rollers 351 are received in the recesses of the cam surfaces 350 and are not engaged with the ring rotor 34. Thus the ring rotor 34 rotating in the first direction D1 does not rotate the annular portion 33a of the carrier 33.

As shown in FIG. 10, when the ring rotor 34 is rotating in the second direction D2, the proximal end 354a of the second biasing member 354 engages with the roller case 352 and moves the roller case 352 and the rollers 351 in the first direction D1 against the biasing force of the first biasing member 353 in the second rotation direction D2. The rollers 351 move in the first direction D1 and the radially outward direction on the cam surfaces 350, and are engaged with the ring rotor 34. Therefore the ring rotor 34 rotating in the second direction D2 rotates the annular portion 33a of the carrier 33 in the second direction D2.

It will be apparent to those skilled in the bicycle field from the present disclosure that the one-way clutch 35 can be of other spring-loaded roller types or sprag types. The one-way clutches 36 and 37 similarly have any suitable structures as needed and/or desired.

As shown in FIG. 8, the carrier 33 includes a cam surface 41 arranged oppositely to the motor 21 in an axial direction. The cam surface 41 rotatably supports a brake roller 42. In the present embodiment, a brake roller case 40 is fixedly arranged on the coaster brake mount portion 33c of the carrier 33. The brake roller case 40 includes the cam surface 41 that rotatably supports the brake roller 42. The cam surface 41 is shaped such that the brake roller 42 presses the coaster brake shoe 16 toward the braking surface 15a in a radially outward direction when the hub driver 13 is rotated in the second direction D2. The cam surface 41 includes a braking actuation region, such as an outwardly projected region, and a non-actuation region, such as a recess. The braking actuation region is formed adjacent to the non-actuation region in a circumferential direction of the carrier 33. The braking actuation region is arranged closer to the braking surface 15a than the non-actuation region in the radial direction. The braking actuation region may include an inclined or curved surface. The brake roller 42 and the brake roller case 40 may be a spring-loaded roller type one-way clutch as illustrated in FIGS. 9 and 10, but other suitable structures and arrangements can be used as needed and/or desired.

Figure 11:
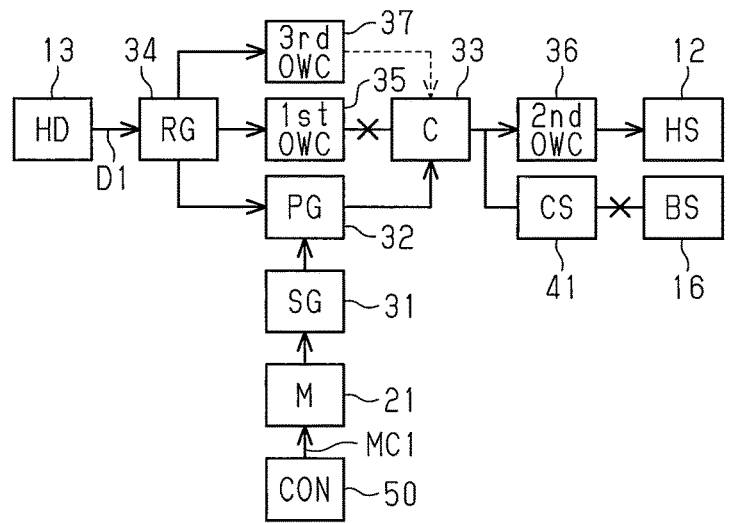
FIG. 11 is a block diagram of the bicycle hub assembly of FIG. 8 when the bicycle is propelling.
Figure 12:
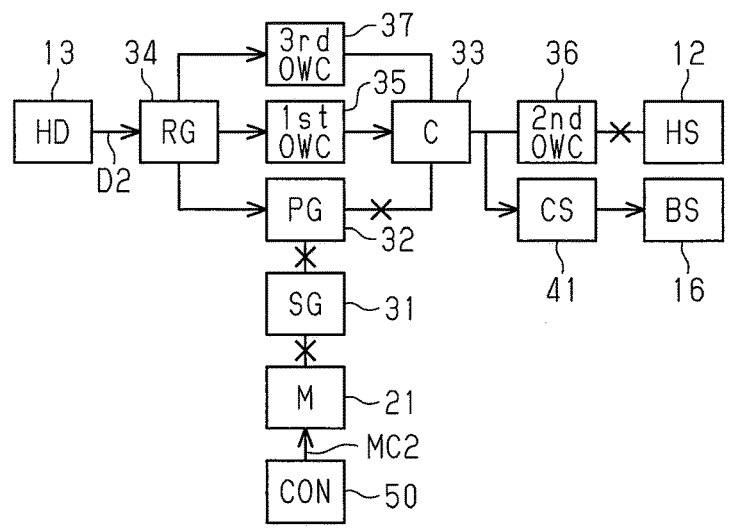
FIG. 12 is a block diagram of the bicycle hub assembly of FIG. 8 when the bicycle is braking.
Figure 13:
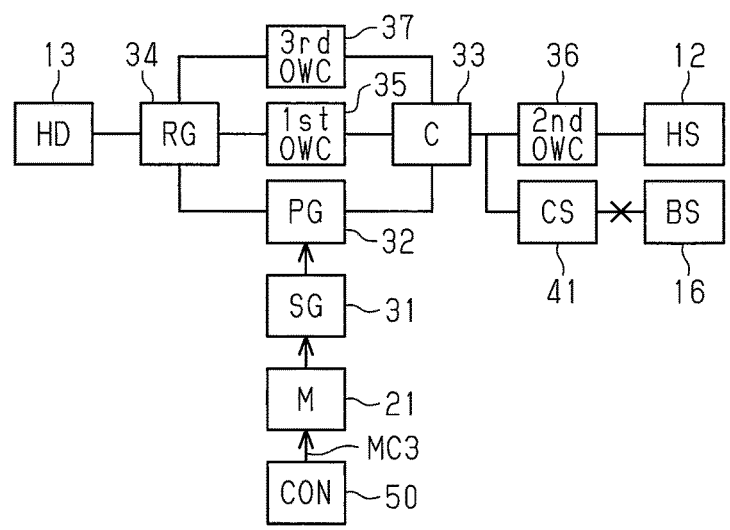
FIG. 13 is a block diagram of the bicycle hub assembly of FIG. 8 when the bicycle is coasting.

Referring to FIGS. 11 to 13, operations of the bicycle hub assembly 10a of FIG. 8 is described below.

In FIGS. 11 to 13, "HS" is an abbreviation for the hub shell 12, "HD" is an abbreviation for the hub driver 13, "BS" is an abbreviation for the coaster brake shoe 16, "M" is an abbreviation for the motor 21, "SG" is an abbreviation for the sun rotor 31, "PG" is an abbreviation for the planetary rotor 32, "C" is an abbreviation for the carrier 33, "RG" is an abbreviation for the ring rotor 34, "CS" is an abbreviation for the cam surface 41, "CON" is an abbreviation for the controller 50, and "OWC" is an abbreviation for the one-way clutches 35-37.

As shown in FIG. 11, the hub driver 13 rotates in the first direction D1 when the rider pedals forward to propel the bicycle. The hub driver 13 rotating in the first direction D1 rotates the ring rotor 34 in the first direction D1. The ring rotor 34 rotates the carrier 33 in the first direction D1 via the planetary rotors 32 if a rotation rate of the carrier 33 in the first direction D1 is higher than a rotation rate of the ring rotor 34 in the first direction D1. The carrier 33 rotating in the first direction D1 rotates the hub shell 12 in the first direction via the second one-way clutch 36 if a rotation rate of the hub shell 12 in the first direction D1 is not higher than that of the carrier 33 in the first direction D1. In this situation, the brake roller 42 is maintained on the non-actuation region of the cam surface 41 and is radially separated from the coaster brake shoe 16. Therefore the brake roller 42 does not generate frictional braking force.

When the bicycle is propelling, the controller 50 controls the motor 21 by supplying the gear ratio request signal MC1 configured to drive the motor 21 at a controlled motor speed in a controlled rotation direction. The motor 21 generates torque and rotates the sun rotor 31 at the controlled motor speed in the controlled rotation direction.

The rotation rate of the carrier 33 is increased and decreased depending on the rotation direction and the rotation rate of the sun rotor 31. Accordingly, the gear ratio of the bicycle hub assembly 10 is varied in accordance with the rotation direction and the motor speed of the motor 21. For example, when the controller 50 maintains the motor speed of the motor 21 at a certain speed, the gear ratio of the bicycle hub assembly 10 is unchanged. When the controller 50 changes the motor speed of the motor 21 in a stepped manner, the gear ratio of the bicycle hub assembly 10 is changed in a stepped manner. When the controller 50 changes the motor speed of the motor 21 in a stepless manner, the gear ratio of the bicycle hub assembly 10 is changed in a stepless manner.

As shown in FIG. 12, the hub driver 13 rotates in the second direction D2 when the rider pedals backward to decelerate or stop the bicycle. The hub driver 13 rotating in the second direction D2 rotates the ring rotor 34 in the second direction D2. The ring rotor 34 rotates the carrier 33 in the second direction D2 via the first one-way clutch 35. In this situation, the brake roller 42 rolls from the non-actuation region to the braking actuation region on the cam surface 41 and presses the coaster brake shoe 16 against the braking surface 15a, thereby generating the frictional braking force.

The rotation of the carrier 33 in the second direction D2 does not rotate the hub shell 12 in the second direction D2 due to the second one-way clutch 36. Therefore the hub shell 12 stops soon by the frictional braking force. Furthermore, the controller 50 controls the motor 21 with the rotation-stop signal MC2. The motor 21 stops generating torque or forcibly stops rotating in accordance with the rotation-stop signal MC2 as discussed earlier. Accordingly, when the hub driver 13 is rotated in the second direction D2, the motor 21 is controlled to generate and apply electromagnetic braking force to the sun rotor 31. The motor 21 may be controlled to allow free rotation of the rotary shaft 21a when the hub driver 13 is rotated in the second direction D2.

When the rotation direction of the hub driver 13 is changed from the second direction D2 to the first direction D1, the brake roller 42 returns from the braking actuation region to the non-actuation region on the cam surface 41 and stops generating the frictional braking force.

As shown in FIG. 13, when the bicycle is coasting, the hub driver 13 and the ring rotor 34 do not rotate in the first direction D1. The second one-way clutch 36 allows the hub shell 12 to be rotating in the first direction D1 by inertia. The motor 21 rotates at a relatively low motor speed in accordance with the stand-by signal MC3 or stops rotating as discussed earlier.

The bicycle hub assembly 10a of FIG. 8 has the advantages described below.

The transmission device 20, arranged inside the hub shell 12 and including the motor 21, conveys rotation of the hub driver 13 in the first direction D1 to the hub shell 12 at a selected gear ratio. And, the coaster brake shoe 16 is configured to be pressed against the braking surface 15a by a rotary motion of the transmission device 20 caused by rotation of the hub driver 13 in the second direction D2 to generate frictional braking force. The bicycle hub assembly 10a uses rotational motion of the transmission device 20 to actuate a coaster braking function. No axially movable component is arranged in the hub shell 12 to actuate a coaster braking function. For example, none of the carrier 33, the cam surface 41, and the coaster brake shoe 16 moves in the axial direction of the hub axle 11. Similarly, the bicycle hub assembly 10a uses rotational motion of the transmission device 20 to actuate a gear shift function. No axially movable component is arranged in the hub shell 12 to actuate a gear shift function. This shrinks empty space in the hub shell 12 in the axial direction.

The motor 21 is arranged remotely from the coaster brake shoe 16 in the axial direction of the hub shell 12. For example, the motor 21 and the coaster brake shoe 16 are arranged at opposite sides of the epicyclic rotor mechanism 30 in the axial direction of the hub axle 11. This reduces the inner diameter of the hub shell 12 of the bicycle hub assembly 10a.

The motor 21 is arranged concentrically with the central axis Ax. This reduces the inner diameter of the hub shell 12 of the bicycle hub assembly 10a.

The bicycle hub assembly 10a includes the motor 21 coupled to the epicyclic rotor mechanism 30. The motor 21 can change the gear ratio of the bicycle hub assembly 10a in a stepped or stepless manner. This easily obtains a wide-ratio bicycle hub assembly 10a.

The bicycle hub assembly 10a includes the third one-way clutch 37. The third one-way clutch 37 allows the carrier 33 to be rotated with a 1:1 gear ratio relative to the hub driver 13. Accordingly, the frictional braking force is proportional to the rotation angle of the hub driver 13 (the crankshaft 2). In addition, the third one-way clutch 37 eliminates the need to activate and/or drive the motor 21 for the purpose of equalizing angular velocity of the carrier 33 with that of the hub driver 13 in the first direction D1. This simplifies and downsizes the computer program for controlling the motor 21, lowers computation load of the controller 50, and reduces power consumption of the electric power source 51 by the motor 21 and/or the controller 50.

The motor 21 is directly or indirectly coupled to a controller 50. The motor 21 is rotated at controlled motor speed in accordance with a gear ratio request signal MC1 from the controller 50 to change the gear ratio in a stepped or stepless manner or maintain a selected gear ratio if the bicycle B is being propelled with pedaling. The motor 21 is stopped in accordance with a rotation-stop signal MC2 from the controller 50 if the bicycle B is stopped. This may improve the controllability of the coaster braking function and/or the electrically gear shifting function of the bicycle hub assembly 10a.

A bicycle hub assembly 10b in accordance with a second working example of the first embodiment is described below.

Figure 14:
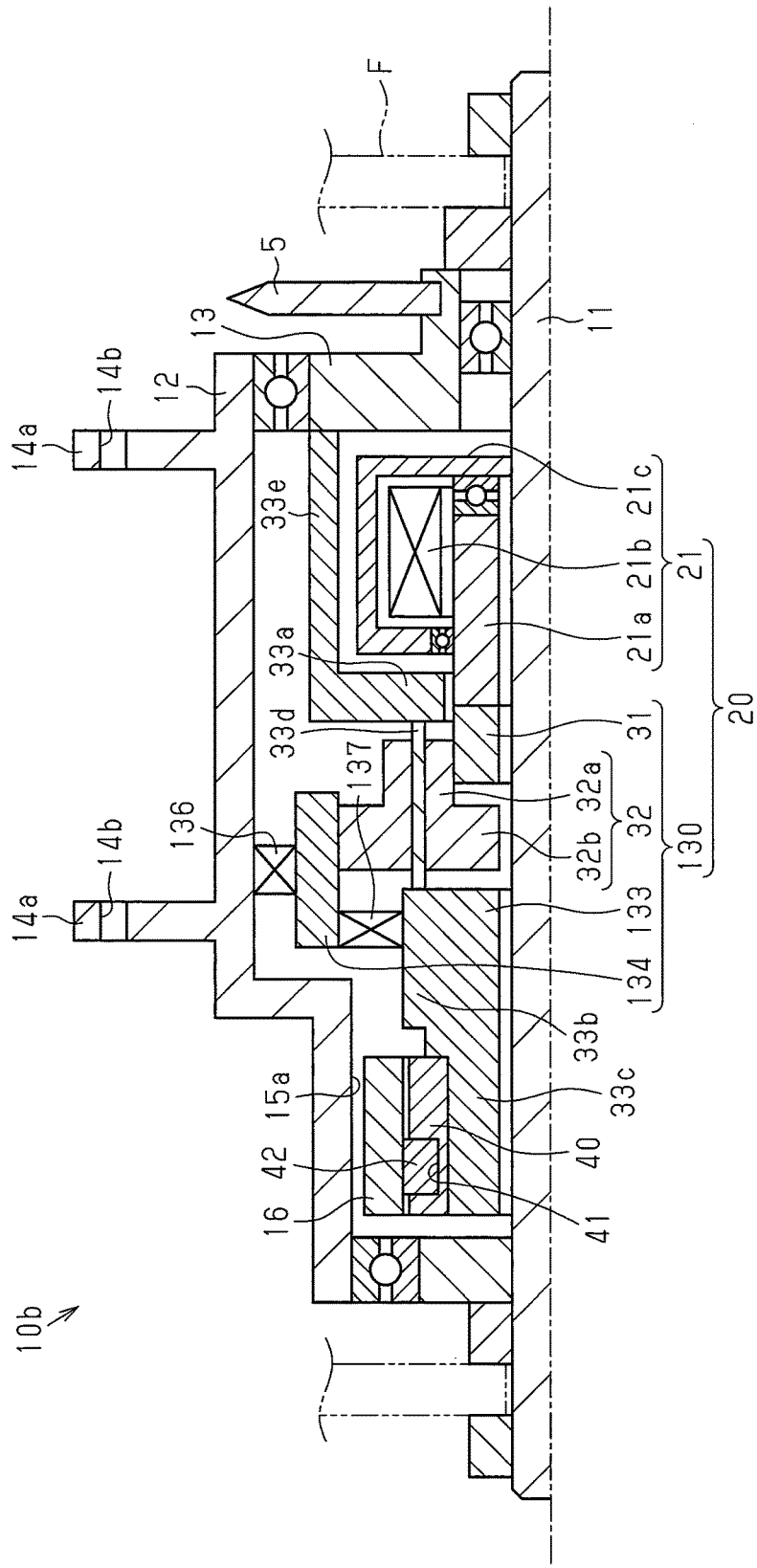
FIG. 14 is a cross-sectional view of a bicycle hub assembly in accordance with a second working example of the first embodiment.

As shown in FIG. 14, the bicycle hub assembly 10b of the second working example includes an epicyclic rotor mechanism 130 in place of the epicyclic rotor mechanism 30 of FIG. 8. The epicyclic rotor mechanism 130 includes a sun rotor 31 arranged coaxially with the hub axle 11, a plurality of planetary rotors 32 coupled to the sun rotor 31, a carrier 133 rotatably supporting the plurality of planetary rotors 32, and a ring rotor 134 coupled to the plurality of planetary rotors 32. The motor 21 includes a rotary shaft 21a coupled to the sun rotor 31. One distinction of the bicycle hub assembly 10b of FIG. 14 is that the carrier 133 of the epicyclic rotor mechanism 130 serves as a rotation input member, and the ring rotor 134 of the epicyclic rotor mechanism 130 serves as a rotation output member. The structure of the epicyclic rotor mechanism 130 is described in the following.

Similar to the carrier 33 of FIG. 8, the carrier 133 of FIG. 14 includes the annular portion 33a, the circular cylindrical intermediate portion 33b, and the coaster brake mount portion 33c. The carrier 133 further includes a tubular connecting portion 33e, which connects the annular portion 33a to the hub driver 13. The tubular connecting portion 33e is fixedly connected to or integrally formed with the annular portion 33a and the hub driver 13. The hub driver 13, the tubular connecting portion 33e, and the annular portion 33a can be integrally formed as a one-piece member.

The ring rotor 134 is separated from the tubular connecting portion 33e of the carrier 133 in the axial direction. The ring rotor 134 is meshed with the larger diameter portions 32b of the planetary rotors 32.

The epicyclic rotor mechanism 130 includes first and second one-way clutches 136, 137. The first one-way clutch 136 is coupled to a first radial position, or the outer surface, of the ring rotor 134. The second one-way clutch 137 is coupled to a second radial position, or the inner surface, of the ring rotor 134.

The first one-way clutch 136 is coupled to the ring rotor 134 and the hub shell 12. The first one-way clutch 136 is configured to engage the ring rotor 134 with the hub shell 12 when the hub driver 13 (the carrier 133) is rotating in the first direction D1 and the rotation rate of the hub shell 12 in the first direction D1 is not higher than that of the ring rotor 134 in the first direction D1. The first one-way clutch 136 is configured to disengage the ring rotor 134 from the hub shell 12 when the hub driver 13 (the carrier 133) is rotating in the second direction D2 and when the hub driver 13 (the carrier 133) is rotating in the first direction D1 and the rotation rate of the hub shell 12 in the first direction D1 is higher than that of the ring rotor 134 in the first direction D1.

The second one-way clutch 137 is coupled to the ring rotor 134 and the carrier 133 (the circular cylindrical intermediate portion 33b). The second one-way clutch 137 is configured to engage the carrier 133 with the ring rotor 134 when the hub driver 13 (the carrier 133) is rotating in the first direction D1 and the rotation rate of the ring rotor 134 in the first direction D1 is not higher than that of the carrier 133 in the first direction D1 and to disengage the carrier 133 from ring rotor 134 when the hub driver 13 (the carrier 133) is rotating in the second direction D2 and when the hub driver 13 (the carrier 133) is rotating in the first direction D1 and the rotation rate of the ring rotor 134 in the first direction D1 is higher than that of the carrier 133 in the first direction D1.

Figure 15:
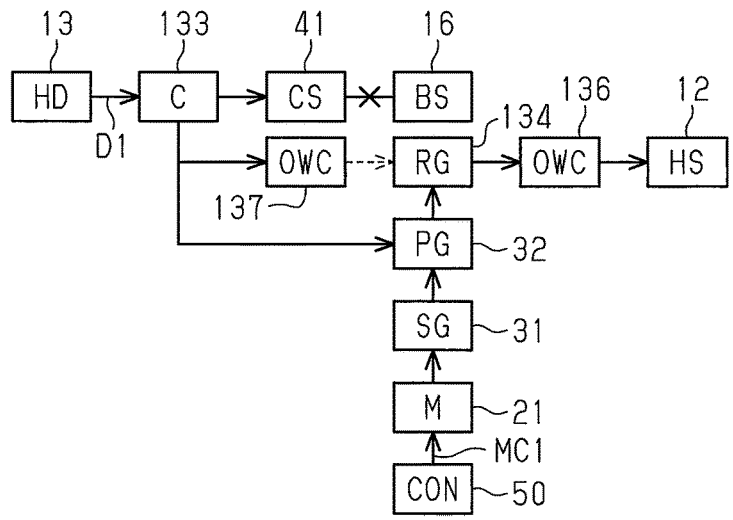
FIG. 15 is a block diagram of the bicycle hub assembly of FIG. 14 when the bicycle is propelling.
Figure 16:
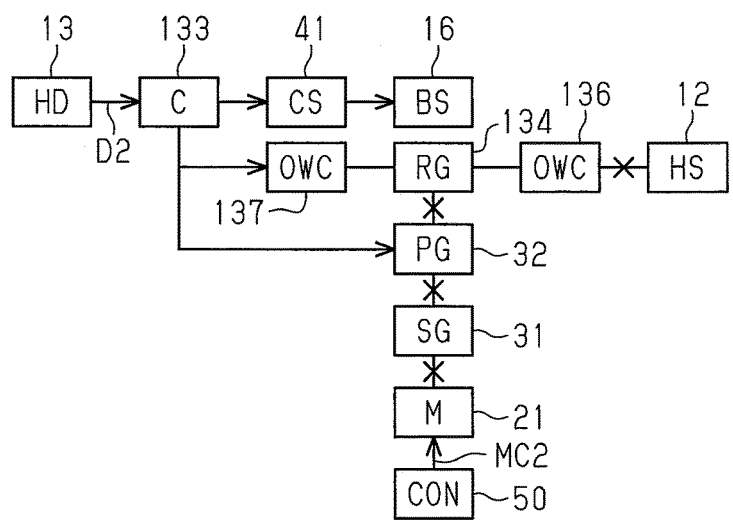
FIG. 16 is a block diagram of the bicycle hub assembly of FIG. 14 when the bicycle is braking.
Figure 17:
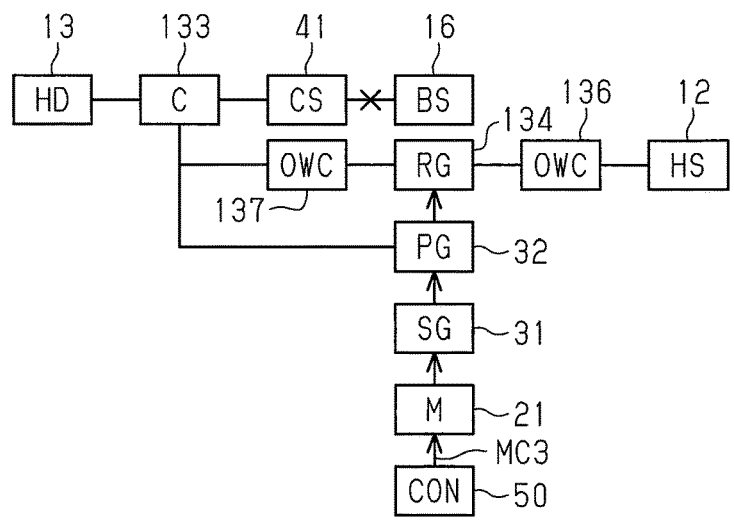
FIG. 17 is a block diagram of the bicycle hub assembly of FIG. 14 when the bicycle is coasting.

Referring to FIGS. 15 to 17, operations of the bicycle hub assembly 10b of FIG. 14 is described below.

As shown in FIG. 15, the hub driver 13 is rotating in the first direction D1 when the rider pedals forward to propel the bicycle. The hub driver 13 rotating in the first direction D1 rotates the carrier 133 in the first direction D1. The carrier 133 rotates the ring rotor 134 in the first direction D1 via the second one-way clutch 137 when a rotation rate of the carrier 133 in the first direction D1 is not higher than that of the ring rotor 134 in the first direction D1. When the controller 50 drives the motor 21 and the rotation rate of the carrier 133 in the first direction D1 becomes higher than that of the ring rotor 134 in the first direction D1, the ring rotor 134 rotates in the first direction D1 via the planetary rotors 32. The carrier 133 rotating in the first direction D1 rotates the hub shell 12 in the first direction via the first one-way clutch 136 when the rotation rate of the hub shell 12 in the first direction D1 is not slower than that of the ring rotor 134 in the first direction D1. In short, the rotation motion of the hub driver 13 in the first direction D1 is conveyed to the hub shell 12 via a path which includes the carrier 133, the second one-way clutch 137, the ring rotor 134, and the first one-way clutch 136 in a sequential manner and via a path which includes the carrier 133, the planetary rotors 32, the ring rotor 134, and the first one-way clutch 136 in a sequential manner.

In this situation, the brake roller 42 is located on the non-actuation region of the cam surface 41 and thus does not generate frictional braking force.

As shown in FIG. 16, the hub driver 13 is rotating in the second direction D2 when the rider pedals backward to stop the bicycle. The rotation motion of the hub driver 13 in the second direction D2 is conveyed to the coaster brake shoe 16 via the carrier 133 without involving the ring rotor 134 and the one-way clutches 136, 137. In this situation, the brake roller 42 moves to the braking actuation region on the cam surface 41 and thus generates frictional braking force.

As shown in FIG. 17, when the bicycle is coasting, the one-way clutches 136 and 137 allow the hub shell 12 to be rotating in the first direction D1 by inertia.

In FIGS. 15 to 17, the motor 21 is controlled by the controller 50 in a manner similar to the first working example.

The bicycle hub assembly 10b of the second working example has the advantages described below.

The one-way clutches 136 and 137 are coupled to the outer and inner surfaces of the ring rotor 134. This shortens the axial length of the epicyclic rotor mechanism 130.

The bicycle hub assembly 10b includes the one-way clutches 136 and 137. The first one-way clutch 35 of FIG. 8 is omitted. This reduces the weight of the bicycle hub assembly 10b.

A bicycle control system 200 in accordance with the second embodiment is described below referring to FIGS. 18 and 19.

Figure 18:
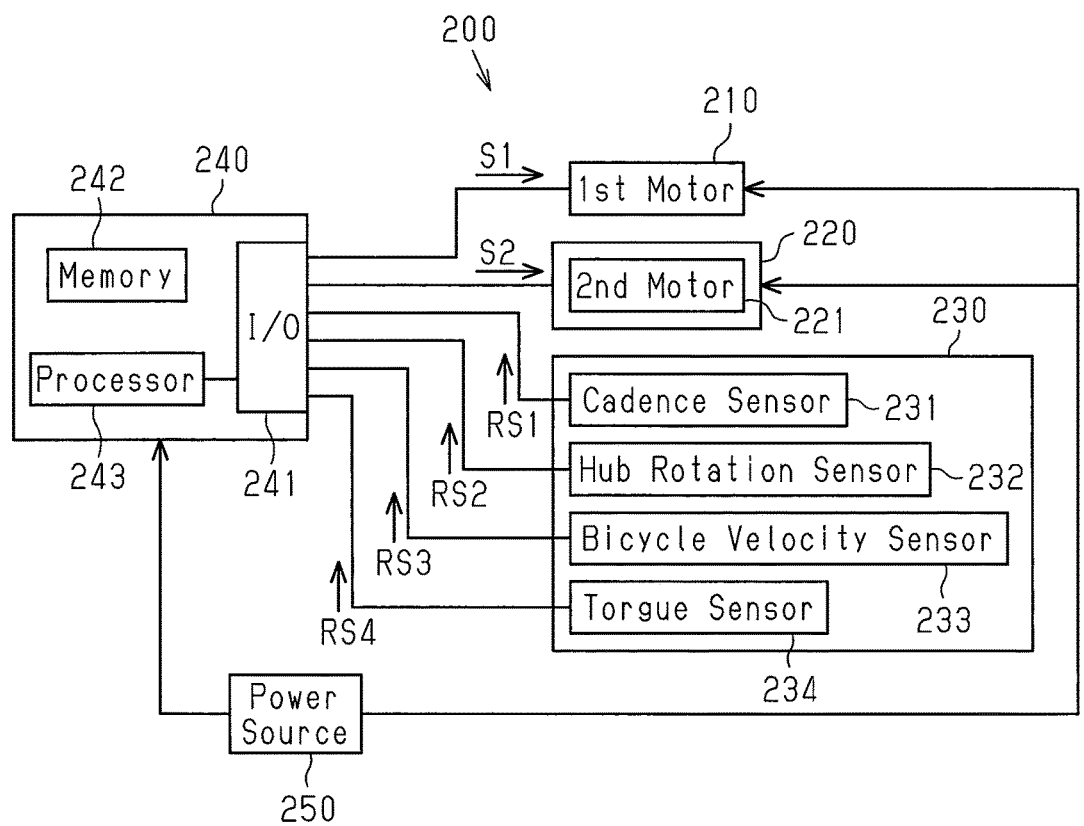
FIG. 18 is a block diagram of a bicycle control system in accordance with a second embodiment.

As shown in FIG. 18, the bicycle control system 200 includes a first motor 210, a hub assembly 220, and a second motor 221 arranged in the hub assembly 220.

Figure 19:
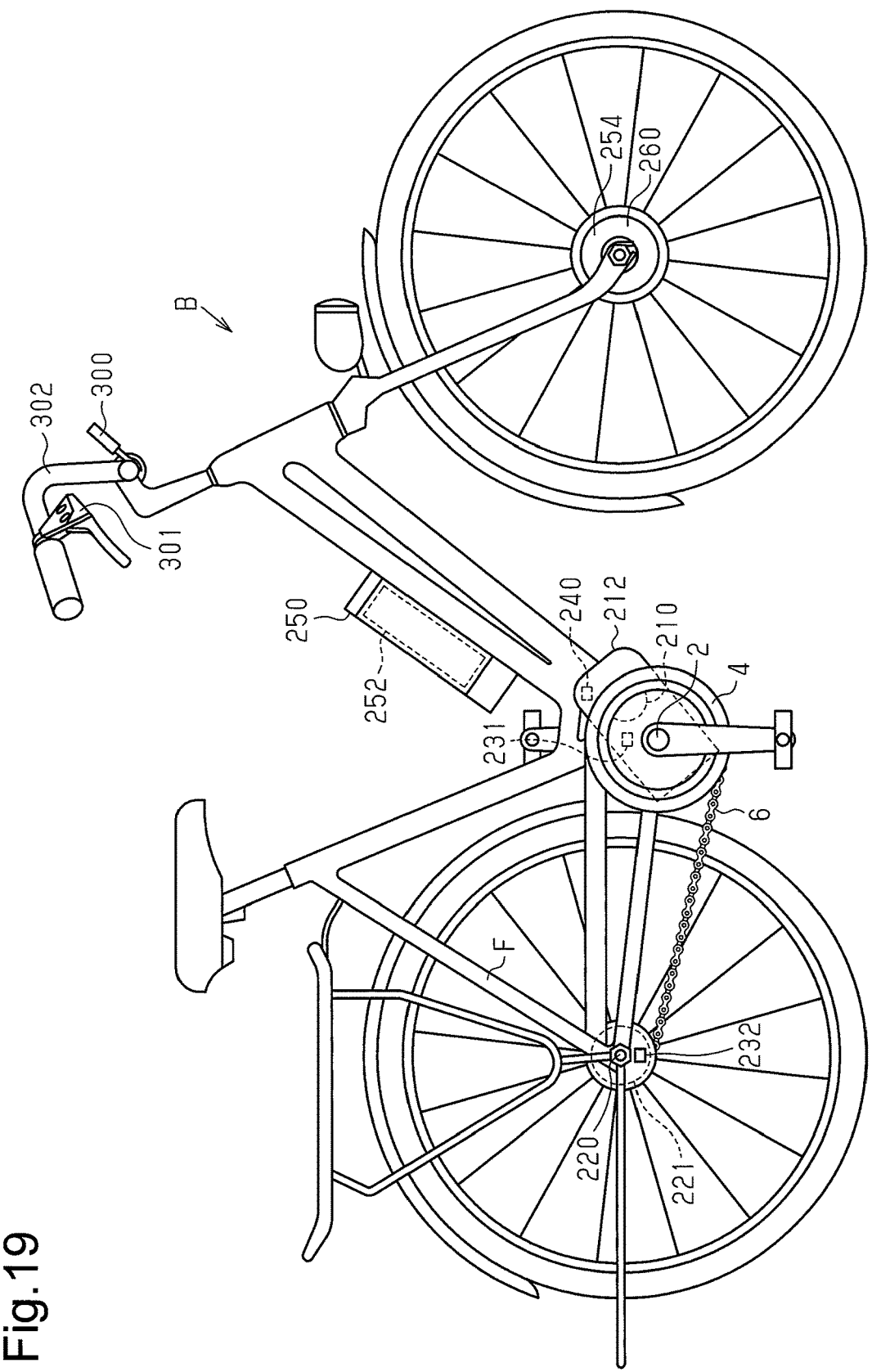
FIG. 19 is a schematic view of a bicycle including the bicycle control system of FIG. 18.

As shown in FIG. 19, the first motor 210 is arranged adjacent to the crankshaft 2, or a bottom bracket, of a bicycle B. In FIG. 19, the first motor 210 is accommodated in a crank unit casing 212, which is attached to the bicycle frame F and covers the crankshaft 2.

The first motor 210 is connected to the crankshaft 2 via a one-way clutch (see Japanese Patent No. 5442814, which is incorporated herein by reference). In this case, the first motor 210 includes a rotary shaft arranged parallel to the crankshaft 2 and offset upward or downward from the crankshaft 2. Alternatively, the first motor 210 may be arranged coaxially with and directly connected to the crankshaft 2. It will be apparent to those skilled in the bicycle field from the present disclosure that the first motor 210 can be connected to the crankshaft 2 via other type of gear trains, such as an epicyclic gear train, as needed and/or desired.

An example of the hub assembly 220 is the bicycle hub assembly 10 of FIG. 8 or 14, which includes the coaster brake shoe 16 and the coaster brake mount portion 33c. The hub assembly 220 includes the hub driver 13 coupled to the crankshaft 2 via at least the driving member 6. In other example, the hub assembly 220 may not include at least one of the coaster brake shoe 16 and the coaster brake mount portion 33c of FIGS. 8 and 14.

The second motor 221 is arranged in the hub assembly 220 to generate torque for at least changing or maintaining a gear ratio. An example of the second motor 221 is the motor 21 of the bicycle hub assembly 10 of FIGS. 8 and 14. The second motor 221 is distanced from the first motor 210 in the front-rear direction of the bicycle B.

The bicycle control system 200 includes at least one rotation sensor 230 that detect rotation of one or both of the crankshaft 2 and the hub driver 13 and outputs a sensor signal RS. Examples of the rotation sensor 230 include a cadence sensor 231 that detects a cadence, or rotation rate of the crankshaft 2 and outputs a first sensor signal RS1 indicative of the detected cadence, and a hub rotation sensor 232 that detects rotation rate of the hub driver 13 and outputs a second sensor signal RS2 indicative of the detected rotation rate. The cadence sensor 231 is arranged in the crank unit casing 212. The hub rotation sensor 232 is arranged in the hub shell 12. The cadence sensor 231 and the hub rotation sensor 232 may include magnetic sensor elements, magneto resistive sensor elements, or other sensor elements.

The rotation sensor 230 of FIG. 18 includes both the cadence sensor 231 and the hub rotation sensor 232. However, it will be apparent to those skilled in the bicycle field from the present disclosure that one of the cadence sensor 231 and the hub rotation sensor 232 can be omitted.

As shown in FIG. 18, the bicycle control system 200 includes a system controller ("controller") 240 connected to the first motor 210, the second motor 221, and the rotation sensor 230, and controls the first motor 210 and the second motor 221 in accordance with the sensor signal RS provided from the rotation sensor 230.

The bicycle control system 200 includes an I/O interface 241 connected to the rotation sensor 230 via a wired or wireless communication link. The controller 240 receives the sensor signal RS of the rotation sensor 230 via the I/O interface 241.

The bicycle control system 200 includes a memory 242 that stores computer readable instructions (software or program) configured to control the first motor 210 and the second motor 221 in accordance with the sensor signal RS received by the I/O interface 241.

The controller 240 includes a processor 243 configured to access the memory 242 to execute the computer readable instructions and generates a motor control signal for controlling the first motor 210 and the second motor 221. For example, the processor 243 (controller 240) generates a first control signal S1 for controlling the first motor 210 in accordance with the first sensor signal RS1 provided from the cadence sensor 231. The processor 243 (controller 240) generates a second control signal S2 for controlling the second motor 221 in accordance with the first sensor signal RS1 provided from the cadence sensor 231. The processor 243 (controller 240) may generates a first control signal S1 for controlling the first motor 210 in accordance with the second sensor signal RS2 provided from the hub rotation sensor 232, and/or the processor 243 (controller 240) may generates a second control signal S2 for controlling the second motor 221 in accordance with the second sensor signal RS2 provided from the hub rotation sensor 232. In some implementations, the controller 240 may be configured to monitor human-powered driving force and control the first motors 210 and the second motor 221 in accordance with the monitored human-powered driving force. The human-powered driving force may be detected via a sensor arranged to detect torque in a driving force transmitting path between the pedal 7 and the hub shell 12. It is preferable that the sensor is arranged to detect torque in a path between the pedal 7 and the front sprocket 4. As shown in FIG. 19, the controller 240 is arranged in the crank unit casing 212. However, it will be apparent to those skilled in the bicycle field from the present disclosure that the controller 240 can be provided on other components of the bicycle, such as a handlebar 302. For example, the controller 240 may be included in a cycle computer 300 and/or an operating unit 301 such as a hand lever.

As shown in FIG. 18, the system 200 includes an electric power source 250 electrically connected to the first motor 210, the second motor 221, and the controller 240. As shown in FIG. 19, the electric power source 250 includes a rechargeable battery 252 detachably mounted on the bicycle frame F. The electric power source 250 can include a generator 254 arranged in a front hub assembly 260. In addition to or in place of the generator 254 of the front hub assembly 260, the hub assembly 220 may include further generator. It will be apparent to those skilled in the bicycle field from the present disclosure that the electric power source 250 can be electrically connected to the motors 210, 221 and the controller 240 in any known manner.

The first motor 210 is or includes a first assist motor that generates torque for producing motor-powered assist force and/or for at least changing or maintaining a gear ratio. In other words, the first motor 210 may be a pedal assist motor, a front internal gear shifting motor, or combination thereof.

In one example, the first motor 210 is a pedal assist motor that generates torque for producing motor-powered assist force. In this case, the controller 240 may provide the first motor 210 with a motor-powered assist request signal as the first control signal S1. The first motor 210 rotates and adds the motor-powered assist force to the driving member 6 via the front sprocket. The controller 240 may provide the second motor 221 with a gear ratio request signal as the second control signal S2. The second motor 221 rotates at a controlled motor speed corresponding to the gear ratio request signal and changes the gear ratio in a stepped or stepless manner or maintains a selected gear ratio.

In other example, the first motor 210 is a front internal gear shifting motor that generates torque for changing or maintaining a gear ratio. The second motor 221 is a rear internal gear shifting motor that generates torque for changing or maintaining a gear ratio. In this case, the controller 240 provides the first motor 210 and the second motor 221 with gear ratio request signals as the first and second control signals S1 and S2. The first motor 210 and the second motor 221 each rotate at requested motor speed and change the gear ratio in a stepped or stepless manner or maintain a selected gear ratio.

The bicycle control system 200 has the advantages described below.

The bicycle control system 200 includes two discrete motors 210 and 221. Therefore the bicycle control system 200 can synchronously and cooperatively drive the first motor 210 and the second motor 221.

The bicycle control system 200 includes the rotation sensor 230 that detects rotation of the crankshaft 2 and/or the hub driver 13 and outputs the sensor signal RS. Therefore the bicycle control system 200 can monitor the rotation status of the crankshaft 2 and/or the hub driver 13 and drive the first motor 210 and the second motor 221 depending on the rotation status of the crankshaft 2 and/or the hub driver 13.

The bicycle control system 200 includes the controller 240. Therefore the bicycle control system 200 can electrically control the first motor 210 and the second motor 221 depending on the current rotation status of the crankshaft 2 and/or the hub driver 13. For example, the bicycle control system 200 finely controls the first motor 210 and the second motor 221 to reduce gear-shifting shock and power-assist shock.

The present invention is not limited to the above embodiments. For example, the embodiments may be modified as described below.

In the working examples of FIGS. 8 and 14, the brake roller case 40 is a discrete member mounted on the coaster brake mount portion 33c of the carrier 33, 133. However, the brake roller case 40 and the carrier 33, 133 may be integrally formed as a one-piece member. In this case, an outer surface of the coaster brake mount portion 33c of the carrier 33, 133 includes the cam surface 41.

It will be apparent to those skilled in the bicycle field from the present disclosure that the epicyclic rotor mechanism 30 is not limited to an epicyclic gear mechanism and an epicyclic friction mechanism. A differential epicyclic mechanism may be preferably used, for example, in a case where the driving member 6 is a drive shaft instead of the chain or flexible belt.

It will be apparent to those skilled in the bicycle field from the present disclosure that the third one-way clutch 37 may be omitted as needed and/or desired.

It will be apparent to those skilled in the bicycle field from the present disclosure that the motor 21 is not limited to be arranged concentrically with the central axis Ax. For example, the motor 21 may be arranged eccentrically with the central axis Ax. In this case, the motor 21 may be coupled to the sun rotor 31 via at least one rotatable element, such as idle gears. Alternatively, the motor 21 may be arranged non-parallel to the central axis Ax. For example, the motor 21 may be coupled to the sun rotor 31 via a bevel gear.

In some implementations, the hub assembly does not include a coaster brake.

In some implementations, the system 200 includes a bicycle velocity sensor 233 and a torque sensor 234, in addition to or in place of the cadence sensor 231 and the hub rotation sensor 232. The bicycle velocity sensor 233 detects a bicycle velocity and provides a sensor signal RS3 indicative of the detected bicycle velocity with the controller 240. The bicycle velocity sensor 233 may be arranged to detect rotation rate of a front or rear wheel, as the bicycle velocity. The torque sensor 234 detects torque, which may be human-powered driving force, and provides a sensor signal RS4 indicative of the detected torque with the controller 240. In such an example, the controller 240 may automatically control the motors 210 and 221 in accordance with the detected bicycle velocity and the detected torque. In particular, the system may control the motors 210 and 221 in a synchronized manner without requiring a rider's manual input to an operating unit, such as a gear shifting commander.

As discussed above, the controller 240 controls the first motor 210 and the second motor 221. In one possible implementation, the controller 240 controls the first motor 210 and the second motor 221 in accordance with at least one selected from the group consisting of human-powered driving force, rotation speed of the crankshaft 2, and bicycle velocity. The controller 240 may control the first motor 210 to generate a controlled output torque in accordance with detected human-powered driving force and based on a motor-assist ratio, which may be selected, for example, by a rider of the bicycle B. The controller 240 may compute the human-powered driving force based on torque generated by the second motor 221, for example. In particular, the controller 240 includes a computer program that monitors rotation rates of the hub shell 12 and the hub driver 13 and estimate the human-powered driving force based on detecting torque of the second motor 221 when the hub shell 12 rotates faster than the hub driver 13 in the first direction D1. In some implementations, the controller 240 may include one or more modes for controlling the first motor 210 and the second motor 221. Examples of the one or more modes include a first mode in which the controller 240 drives the first motor 210 alone, a second mode in which the controller 240 drives both the first motor 210 and the second motor 221, a third mode in which the controller 240 drives the second motor 221 alone, and a fourth mode in which the controller 240 drives neither the first motor 210 nor the second motor 221. The first to fourth modes may be selectably switched via an operating unit. The first and second modes each are capable of assisting human-powered driving force. It is preferable that the controller 240, in either the first mode or the second mode, drives the second motor 221 so as to rotate the hub shell 12 faster than the hub driver 13 in the first direction D1 in order to compute the torque generated by the second motor 221.

In some implementations, the one-way clutch 37 and 137 of the above-discussed embodiments may be omitted. In such an example, the controller 240 is able to compute torque of the second motor 221 without forcibly driving the second motor 221 to accelerate the hub shell 12 to rotate in the first direction D1 faster than the hub driver 13. Since torque of the second motor 221 is proportional to torque of the hub driver 13, the controller 240 is able to compute the human-powered driving force through detection of torque of the second motor 221. Even in a situation in which the first motor 210 and human-powered driving force cooperatively generate the torque of the hub driver 13, the controller 240 is able to compute the human-powered driving force alone since the torque of the first motor 210 is controlled by and thus recognizable by the controller 240.

Torque of the second motor 221 may be computed in various methods, such as detecting electric current in the second motor 221, monitoring motor driving current fed to the second motor 221, or monitoring parameter(s) utilized in the controller 240 for controlling the second motor 221.

Rotation rate of the crankshaft 2 may be computed through detection of the rotation rate of the first motor 210. In an example in which no one-way clutch is arranged in a driving force transmitting path between the crankshaft 2 and the first motor 210 and the first motor 210 is connected to a human-powered driving force transmitting path via a reduction gear train, the controller 240 is able to compute the rotation rate of the crankshaft 2 through detecting the rotation rate of the first motor 210 since the reduction ratio of the reduction gear train is predefined. The controller 240 may determine or estimate the rotation rate of the first motor 210 in accordance with electric current in the first motor 210 and/or a detection signal of an encoder arranged in the first motor 210.

The methods for detecting the human-powered driving force and the rotation rate of the crankshaft 2 described herein are not meant to be limiting. In some implementations, the system 200 may include at least one of the torque sensor 234 that detects human-powered driving force and the cadence sensor 231 that detects rotation rate of the crankshaft 2. The torque sensor 234 is or includes a strain gauge, a semiconductor strain sensor, a pressure sensor, or a magnetostrictive sensor. In one example, the torque sensor 234 is arranged, for example, in a driving force transmitting path between the crankshaft 2 and the front sprocket 4 to detect torque imparted to the crankshaft 2. In other example, the torque sensor 234 is fixedly attached on the crank arm 3 or the pedal 7. The cadence sensor 231 may include a magnetic sensor arranged in the crank unit casing 212 to detect one or more magnets arranged on the crankshaft 2. The bicycle velocity may be computed based on the sensor signal RS3 of the bicycle velocity sensor 233.

It is preferable that the controller 240 stops supplying electric power to the first motor 210 and the second motor 221 when the crankshaft 2 stops rotating and when the crankshaft 2 is rotating in the direction RD. The controller 240 may control the second motor 221 in accordance with a request signal fed from a gear shifting commander which is manually operated by a rider.

In some implementations, the system 200 may include one or more operating units, and the controller 240 may control the second motor 221 in accordance with the outputs of the one or more operating units, such as a gear shifting commander.

In some implementations, the controller 240 may include a computer program capable of detecting human-powered driving force through detecting the state of the first motor 210. In this arrangement, a one-way clutch is not arranged for coupling the first motor 210 with the crankshaft 2. In such an example, the system 200 does not require a discrete human-powered torque sensor.

In the above embodiments, the term "attached" or "attaching", as used herein, encompasses configurations in which an element is directly attached to another element by affixing the element directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first", "second" or the like recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

It should be apparent to those skilled in the art that the present invention may be embodied in many other specific forms without departing from the scope of the invention. For example, some of the components may be omitted from the components described in the embodiments (or one or more aspects thereof). Further, components in different embodiments may be appropriately combined. The scope of the present invention and equivalence of the present invention are to be understood with reference to the appended claims.

The invention claimed is:

1. A bicycle hub assembly, comprising: a hub shell including a braking surface; a hub driver directly or indirectly coupled to a driving member and rotatable in a first direction and a second direction opposite to the first direction, wherein the hub driver is rotated in the first direction when a pedal is rotated in a forward travelling direction, and wherein the hub driver is rotated in the second direction when the pedal is rotated in a direction opposite to the forward travelling direction; a coaster brake shoe accommodated in the hub shell to cooperate with the braking surface to generate braking force; and a transmission device arranged inside the hub shell to convey rotation of the hub driver in the first direction to the hub shell at a selected gear ratio, wherein the transmission device includes a motor accommodated in the hub shell and an epicyclic rotor mechanism directly or indirectly coupled to each of the hub driver, the coaster brake shoe, and the motor; the motor is configured to change a gear ratio of a rotation speed of the hub driver to a rotation speed of the hub shell when driving the motor in accordance with pedaling in the forward travelling direction.

2. The bicycle hub assembly according to claim 1, wherein the motor is arranged remotely from the coaster brake shoe in an axial direction of the hub shell.

3. The bicycle hub assembly according to claim 1, wherein the motor is arranged concentrically with a central axis of the hub shell.

4. The bicycle hub assembly according to claim 1, wherein
the motor is directly or indirectly coupled to a controller,
the motor is rotated at controlled motor speed in accordance with a gear ratio request signal from the controller to change the gear ratio in a stepped or stepless manner or maintain a selected gear ratio if the bicycle is being propelled with pedaling, and
the motor is stopped in accordance with a rotation-stop signal from the controller if the bicycle is stopped.

5. The bicycle hub assembly according to claim 1, further comprising a power supply conductor electrically connecting the motor with a battery or a generator.

6. The bicycle hub assembly according to claim 1, further comprising:
a hub axle at least partially covered with the hub shell,
wherein the coaster brake shoe is configured to be pressed against the braking surface by a rotary motion of the transmission device caused by rotation of the hub driver in the second direction to generate frictional braking force.

7. The bicycle hub assembly according to claim 6, wherein the motor and the coaster brake shoe are arranged at opposite sides of the epicyclic rotor mechanism in an axial direction of the hub axle.

8. The bicycle hub assembly according to claim 1, further comprising a first one-way clutch coupled to a first location on the epicyclic rotor mechanism, wherein
when the hub driver is rotated in the first direction, the first one-way clutch stops conveying the rotation of the hub driver in the first direction to the coaster brake shoe so that the coaster brake shoe does not generate frictional braking force, and
when the hub driver is rotated in the second direction, the first one-way clutch permits conveying the rotation of the hub driver in the second direction to the coaster brake shoe via the epicyclic rotor mechanism so that the coaster brake shoe generates frictional braking force.

9. The bicycle hub assembly according to claim 6, wherein the epicyclic rotor mechanism includes
a sun rotor arranged coaxially with the hub axle,
a plurality of planetary rotors coupled to the sun rotor,
a carrier rotatably supporting the plurality of planetary rotors, and
a ring rotor coupled to the plurality of planetary rotors,
wherein the motor includes a rotary shaft coupled to the sun rotor.

10. The bicycle hub assembly according to claim 9, wherein the rotary shaft of the motor is coupled to the sun rotor to rotate integrally with the sun rotor.

11. The bicycle hub assembly according to claim 10, wherein the ring rotor is coupled to the hub driver to rotate integrally with the hub driver.

12. The bicycle hub assembly according to claim 10, wherein when the hub driver is rotated in the second direction, the motor is controlled to generate and apply electromagnetic braking force to the sun rotor or to allow free rotation of the rotary shaft.

13. A bicycle hub assembly, comprising:
a hub shell including a braking surface;
a hub driver;
a coaster brake shoe accommodated in the hub shell to cooperate with the braking surface to generate braking force;
a motor accommodated in the hub shell and configured to change a gear ratio of a rotation speed of the hub driver to a rotation speed of the hub shell;
a hub axle at least partially covered with the hub shell,
the hub driver directly or indirectly coupled to a driving member and rotatable in a first direction and a second direction opposite to the first direction, wherein the hub driver is rotated in the first direction when a pedal is rotated in a forward travelling direction, and wherein the hub driver is rotated in the second direction when the pedal is rotated in a direction opposite to the forward travelling direction; and
a transmission device arranged inside the hub shell to convey rotation of the hub driver in the first direction to the hub shell at a selected gear ratio,
wherein the coaster brake shoe is configured to be pressed against the braking surface by a rotary motion of the transmission device caused by rotation of the hub driver in the second direction to generate frictional braking force,
wherein the transmission device includes the motor,
wherein the transmission device includes an epicyclic rotor mechanism directly or indirectly coupled to each of the hub driver, the coaster brake shoe, and the motor,
the bicycle hub assembly further comprising a first one-way clutch coupled to a first location on the epicyclic rotor mechanism,
wherein when the hub driver is rotated in the first direction, the first one-way clutch stops conveying the rotation of the hub driver in the first direction to the coaster brake shoe so that the coaster brake shoe does not generate frictional braking force,
wherein when the hub driver is rotated in the second direction, the first one-way clutch permits conveying the rotation of the hub driver in the second direction to the coaster brake shoe via the epicyclic rotor mechanism so that the coaster brake shoe generates frictional braking force,
wherein the epicyclic rotor mechanism includes
a sun rotor arranged coaxially with the hub axle,
a plurality of planetary rotors coupled to the sun rotor,
a carrier rotatably supporting the plurality of planetary rotors, and
a ring rotor coupled to the plurality of planetary rotors,
wherein the motor includes a rotary shaft coupled to the sun rotor,
the first one-way clutch is coupled to the ring rotor and the carrier to convey rotation of the hub driver in the second direction to the coaster brake shoe via the first one-way clutch and the carrier and not to convey rotation of the hub driver in the first direction to the carrier.

14. The bicycle hub assembly according to claim 13, further comprising a second one-way clutch coupled to a second location on the epicyclic rotor mechanism, the second location is different from the first location in an axial direction of the hub axle, wherein the second one-way clutch is configured to convey rotation of the hub driver in the first direction to the hub shell via the second one-way clutch and the carrier and not to convey rotation of the hub driver in the second direction to the hub shell.

15. The bicycle hub assembly according to claim 14, wherein the carrier includes a plurality of planetary shafts that rotatably support the plurality of planetary rotors, respectively,
wherein the plurality of planetary rotors are arranged between the first location and the second location of the epicyclic rotor mechanism.

16. The bicycle hub assembly according to claim 14, further comprising a third one-way clutch, arranged at a third location on the epicyclic rotor mechanism different from the first and second locations in the axial direction of the hub axle, to convey rotation of the ring rotor to the carrier and not to convey rotation of the carrier to the ring rotor, wherein the third one-way clutch is coupled to the ring rotor and the carrier to integrally rotate the ring rotor and the carrier at a rotation rate which is equal to a rotation rate of the hub driver when the motor is not rotated.

17. A bicycle hub assembly, comprising:
a hub shell including a braking surface;
a hub driver;
a coaster brake shoe accommodated in the hub shell to cooperate with the braking surface to generate braking force;
a motor accommodated in the hub shell and configured to change a gear ratio of a rotation speed of the hub driver to a rotation speed of the hub shell,
a hub axle at least partially covered with the hub shell;
the hub driver directly or indirectly coupled to a driving member and rotatable in a first direction and a second direction opposite to the first direction, wherein the hub driver is rotated in the first direction when a pedal is rotated in a forward travelling direction, and wherein the hub driver is rotated in the second direction when the pedal is rotated in a direction opposite to the forward travelling direction; and
a transmission device arranged inside the hub shell to convey rotation of the hub driver in the first direction to the hub shell at a selected gear ratio,
wherein the coaster brake shoe is configured to be pressed against the braking surface by a rotary motion of the transmission device caused by rotation of the hub driver in the second direction to generate frictional braking force,
wherein the transmission device includes the motor,
wherein the transmission device includes an epicyclic rotor mechanism directly or indirectly coupled to each of the hub driver, the coaster brake shoe, and the motor,
wherein the epicyclic rotor mechanism includes
a sun rotor arranged coaxially with the hub axle,
a plurality of planetary rotors coupled to the sun rotor,
a carrier rotatably supporting the plurality of planetary rotors, and
a ring rotor coupled to the plurality of planetary rotors,
wherein the motor includes a rotary shaft coupled to the sun rotor, and
wherein the carrier includes a cam surface arranged oppositely to the motor in an axial direction and rotatably supporting a brake roller, wherein the cam surface is shaped such that the brake roller presses the coaster brake shoe toward the braking surface in a radially outward direction when the hub driver is rotated in the second direction.

18. A bicycle hub assembly, comprising:
a hub shell including a braking surface;
a hub driver;
a coaster brake shoe accommodated in the hub shell to cooperate with the braking surface to generate braking force;
a motor accommodated in the hub shell and configured to change a gear ratio of a rotation speed of the hub driver to a rotation speed of the hub shell;
a hub axle at least partially covered with the hub shell, the hub driver directly or indirectly coupled to a driving member and rotatable in a first direction and a second direction opposite to the first direction, wherein the hub driver is rotated in the first direction when a pedal is rotated in a forward travelling direction, and wherein the hub driver is rotated in the second direction when the pedal is rotated in a direction opposite to the forward travelling direction; and
a transmission device arranged inside the hub shell to convey rotation of the hub driver in the first direction to the hub shell at a selected gear ratio,
wherein the coaster brake shoe is configured to be pressed against the braking surface by a rotary motion of the transmission device caused by rotation of the hub driver in the second direction to generate frictional braking force,
wherein the transmission device includes the motor,
wherein the transmission device includes an epicyclic rotor mechanism directly or indirectly coupled to each of the hub driver, the coaster brake shoe, and the motor,
the bicycle hub assembly further comprising:
a first one-way clutch coupled to the hub shell and a ring rotor of the epicyclic rotor mechanism, and
a second one-way clutch coupled to the ring rotor and a carrier of the epicyclic rotor mechanism,
wherein the first and second one-way clutches are arranged so that
the rotation of the hub driver in the first direction is conveyed to the hub shell via the carrier, the second one-way clutch, the ring rotor and the first one-way clutch in a sequential manner, and
the rotation of the hub driver in the second direction is conveyed to the coaster brake shoe via the carrier without involving the ring rotor and the first and second one-way clutches.

19. The bicycle hub assembly according to claim 18, wherein the first one-way clutch is coupled to a first radial position of the ring rotor, and the second one-way clutch is coupled to a second radial position of the ring rotor, the second radial position is different from the first radial position.

* * * * *